(12) United States Patent  (10) Patent No.: US 10,798,652 B2
Eisenwinter et al.  (45) Date of Patent:  Oct. 6, 2020

(54) DISTRIBUTED ANTENNA SYSTEM FOR USE ALONG TRAIN TRACK

(71) Applicant: CommScope Technologies LLC, Hickory, NC (US)

(72) Inventors: Stefan Eisenwinter, Buchdorf (DE); Arndt Paul Pischke, Huisheim (DE); Klaus Peter Möller, Tapfheim (DE); Andreas Huebener, Rosenheim (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/702,277

(22) Filed: Dec. 3, 2019

(65) Prior Publication Data

US 2020/0178170 A1  Jun. 4, 2020

Related U.S. Application Data

(60) Provisional application No. 62/775,214, filed on Dec. 4, 2018.

(51) Int. Cl.
*H04W 52/02* (2009.01)
*H04W 64/00* (2009.01)
*H04W 8/00* (2009.01)

(52) U.S. Cl.
CPC ....... *H04W 52/0206* (2013.01); *H04W 8/005* (2013.01); *H04W 64/006* (2013.01)

(58) Field of Classification Search
CPC . H04W 52/02; H04W 52/0206; H04W 8/005; H04W 64/006; H04W 4/00;

(Continued)

(56) References Cited

U.S. PATENT DOCUMENTS 5,603,080 A  2/1997  Kallander et al.
5,682,256 A  10/1997  Motley et al.
(Continued)

FOREIGN PATENT DOCUMENTS

EP  2819318 B1  12/2017
KR  20110000839 A  1/2011

OTHER PUBLICATIONS

International Searching Authority, "International Search Report and Written Opinion from PCT Application No. PCT/US2019/064277", from Foreign Counterpart to U.S. Appl. No. 16/702,277, dated Mar. 23, 2020, pp. 1-10, Published: WO.

*Primary Examiner* — Thanh C Le
(74) *Attorney, Agent, or Firm* — Fogg & Powers LLC

(57) ABSTRACT

One embodiment is directed to a distributed antenna system (DAS) configured to cause a remote antenna unit deployed near a railroad track to operate in a low-power and/or muted operational state. While the remote antenna unit is operating in the low-power and/or muted operational state, the DAS determines if a train is sufficiently close to a coverage area of the remote antenna unit to trigger a change in an operational state of the remote antenna unit. In response to such a determination, the DAS causes the remote antenna unit to operate in a normal operational state. While the remote antenna unit is operating in the normal operational state, the DAS determines if the train has exited the coverage area of the remote antenna unit. In response to such a determination, the DAS causes the remote antenna unit to operate in the low-power and/or muted operational state.

22 Claims, 12 Drawing Sheets

(58) Field of Classification Search
CPC ... B60Q 7/00; B61L 11/00; B61L 5/12; B61L 5/20; H02J 4/00; H04B 10/11; H04B 7/26
See application file for complete search history.

(56) References Cited

U.S. PATENT DOCUMENTS

| | | | |
|---|---|---|---|
| 6,041,216 | A | 3/2000 | Rose et al. |
| 6,525,855 | B1 | 2/2003 | Westbrook et al. |
| 6,704,545 | B1 | 3/2004 | Wala |
| 6,826,163 | B2 | 11/2004 | Mani et al. |
| 6,826,164 | B2 | 11/2004 | Mani et al. |
| 7,313,415 | B2 | 12/2007 | Wake et al. |
| 7,469,105 | B2 | 12/2008 | Wake et al. |
| 8,787,429 | B2 | 7/2014 | Jovanovic et al. |
| 9,660,698 | B2 | 5/2017 | Derneryd et al. |
| 9,686,007 | B2 | 6/2017 | Braz et al. |
| 10,009,090 | B2 | 6/2018 | Dussmann |
| 10,027,402 | B2 | 7/2018 | Lange et al. |
| 10,367,572 | B2 | 7/2019 | Dussmann et al. |
| 10,419,100 | B2 | 9/2019 | Hanson et al. |
| 10,461,839 | B2 | 10/2019 | Lange et al. |
| 2004/0106435 | A1 | 6/2004 | Bauman et al. |
| 2006/0105705 | A1 | 5/2006 | Maca et al. |
| 2008/0151846 | A1 | 6/2008 | Scheinert et al. |
| 2009/0180426 | A1 | 7/2009 | Sabat et al. |
| 2011/0285842 | A1* | 11/2011 | Davenport .......... B61L 27/0094 348/116 |
| 2012/0309293 | A1* | 12/2012 | Kummetz ............ H04B 7/2606 455/11.1 |
| 2013/0195005 | A1* | 8/2013 | Al-Shalash ........... H04W 36/18 370/315 |
| 2014/0054424 | A1* | 2/2014 | Xu ...................... B61L 27/0038 246/122 R |
| 2014/0166820 | A1 | 6/2014 | Hilleary |
| 2014/0308043 | A1 | 10/2014 | Heidler et al. |
| 2015/0147960 | A1 | 5/2015 | Hanson et al. |
| 2016/0134357 | A1 | 5/2016 | Dussmann et al. |
| 2017/0088046 | A1 | 3/2017 | Denny et al. |
| 2017/0134085 | A1 | 5/2017 | Dussmann |
| 2018/0102829 | A1 | 4/2018 | Lange et al. |
| 2018/0102830 | A1 | 4/2018 | Lange et al. |
| 2018/0176880 | A1 | 6/2018 | Kummetz et al. |
| 2018/0294867 | A1 | 10/2018 | Schwab et al. |
| 2019/0036630 | A1* | 1/2019 | Svennebring ........ H04B 17/373 |
| 2020/0128467 | A1* | 4/2020 | Gao ..................... H04W 48/16 |

\* cited by examiner

DISTRIBUTED ANTENNA SYSTEM FOR USE ALONG TRAIN TRACK

CROSS-REFERENCE TO RELATED APPLICATIONS

This application claims the benefit of U.S. Provisional Patent Application Ser. No. 62/775,214, filed on Dec. 4, 2018, which is hereby incorporated herein by reference in its entirety.

BACKGROUND

A distributed antenna system (DAS) typically includes one or more master units that are communicatively coupled to a plurality of remote antenna units, where each remote antenna unit can be coupled directly to one or more of the master units or indirectly via one or more other remote antenna units and/or via one or more intermediary or expansion units. A DAS is typically used to improve the coverage provided by one or more base stations that are coupled to the master units. These base stations can be coupled to the master units via one or more cables or via a wireless connection, for example, using one or more donor antennas. The wireless service provided by the base stations can include commercial cellular service and/or private or public safety wireless communications.

In general, each master unit receives one or more downlink signals from one or more base stations and generates one or more downlink transport signals derived from one or more of the received downlink base station signals. Each master unit transmits one or more downlink transport signals to one or more of the remote antenna units. Each remote antenna unit receives the downlink transport signals transmitted to it from one or more master units and uses the received downlink transport signals to generate one or more downlink radio frequency signals that are radiated from one or more coverage antennas associated with that remote antenna unit. The downlink radio frequency signals are radiated for reception by user equipment. Typically, this involves, among other things, simulcasting downlink signals received from each base station from multiple remote antenna units. In this way, the DAS increases the coverage area for the downlink capacity provided by the base stations.

Likewise, each remote antenna unit receives one or more uplink radio frequency signals transmitted from the user equipment. Each remote antenna unit generates one or more uplink transport signals derived from the one or more uplink radio frequency signals and transmits them to one or more of the master units. Each master unit receives the respective uplink transport signals transmitted to it from one or more remote antenna units and uses the received uplink transport signals to generate one or more uplink base station radio frequency signals that are provided to the one or more base stations associated with that master unit. Typically, this involves, among other things, combining or summing uplink signals received from multiple remote antenna units in order to produce the base station signal provided to each base station. In this way, the DAS increases the coverage area for the uplink capacity provided by the base stations.

Typically, such a DAS is operated in a "simulcast" mode in which downlink signals for each base station are transmitted from multiple remote antenna units of the DAS and in which uplink signals for each base station are generated by combining signals received at multiple remote antenna units. One issue with operating a DAS in simulcast mode is that, when combining uplink signals received at the multiple remote antenna units, each uplink signal contributes noise to the resulting combined signal. If the resulting noise in the combined uplink signals presented to the receiver of the base station is too high, the receiver can become desensitized, which can negatively impact the performance of the base station. Another issue with operating a DAS in simulcast mode is that, when transmitting downlink signals from multiple remote antenna units, each transmitted downlink signal can interfere with macro base stations transmitting in the same area. If the resulting interference with the macro base station is too high, the performance of the macro base station can be negatively impacted.

Also, each remote antenna unit must be provided with power in order to power the electronics in it. The RF electronics in the remote antenna unit consume a significant amount of power (for example, on the order of a kilowatt of power). When the remote antenna units are located in a rural outdoor location and communicate with other nodes in the DAS over one or more optical fibers, there can be challenges in providing power to the remote antenna units. Solar powering the remote antenna unit is typically not a viable option given the amount of power consumed by the RF electronics.

SUMMARY

One embodiment is directed to a distributed antenna system (DAS). The DAS comprises a main unit communicatively coupled to one or more base stations and one or more remote antenna units communicatively coupled to the main unit. At least one of the remote antenna units is deployed near a railroad track over which a train travels. The DAS is configured to do the following for each of the at least one of the remote antenna units: cause said remote antenna unit to operate in a low-power and/or muted operational state; while said remote antenna unit is operating in the low-power and/or muted operational state, determine if the train is sufficiently close to a coverage area of said remote antenna unit to trigger a change in an operational state of said remote antenna unit; in response to determining that the train is sufficiently close to the coverage area of said remote antenna unit to trigger the change in the operational state of said remote antenna unit, cause said remote antenna unit to operate in a normal operational state; while said remote antenna unit is operating in the normal operational state, determine if the train has exited the coverage area of said remote antenna unit; and in response to determining that the train has exited the coverage area of said remote antenna unit, cause said remote antenna unit to operate in the low-power and/or muted operational state.

Another embodiment is directed to a method of operating a distributed antenna system (DAS). The DAS comprises a main unit communicatively coupled to one or more base stations and one or more remote antenna units communicatively coupled to the main unit. At least one of the remote antenna units is deployed near a railroad track over which a train travels. The method comprises, for each of the at least one remote antenna units: causing said remote antenna unit to operate in a low-power and/or muted operational state; while said remote antenna unit is operating in the low-power and/or muted operational state, determining if the train is sufficiently close to a coverage area of said remote antenna unit to trigger a change in an operational state of said remote antenna unit; in response to determining that the train is sufficiently close to the coverage area of said remote antenna unit to trigger the change in the operational state of said remote antenna unit, causing said remote antenna unit to operate in a normal operational state; while said remote antenna unit is operating in the normal operational state, determining if the train has exited the coverage area of said remote antenna unit; and in response to determining that the train has exited the coverage area of said remote antenna unit, causing said remote antenna unit to operate in the low-power and/or muted operational state.

Other embodiments are disclosed.

The details of various embodiments are set forth in the accompanying drawings and the description below. Other features and advantages will become apparent from the description, the drawings, and the claims.

DRAWINGS

FIG. 1 is a block diagram illustrating one exemplary embodiment of a distributed antenna system in which one or more of the remote antenna units are configured to support an on-demand mode.

FIG. 2 comprises a high-level flowchart illustrating one exemplary embodiment of a method of operating a distributed antenna system to provide improved coverage for a train traveling on a train track.

FIG. 9 illustrates how travel time can be determined based on a number of coverage areas a train must pass through.

Like reference numbers and designations in the various drawings indicate like elements.

DETAILED DESCRIPTION

Figure 1:
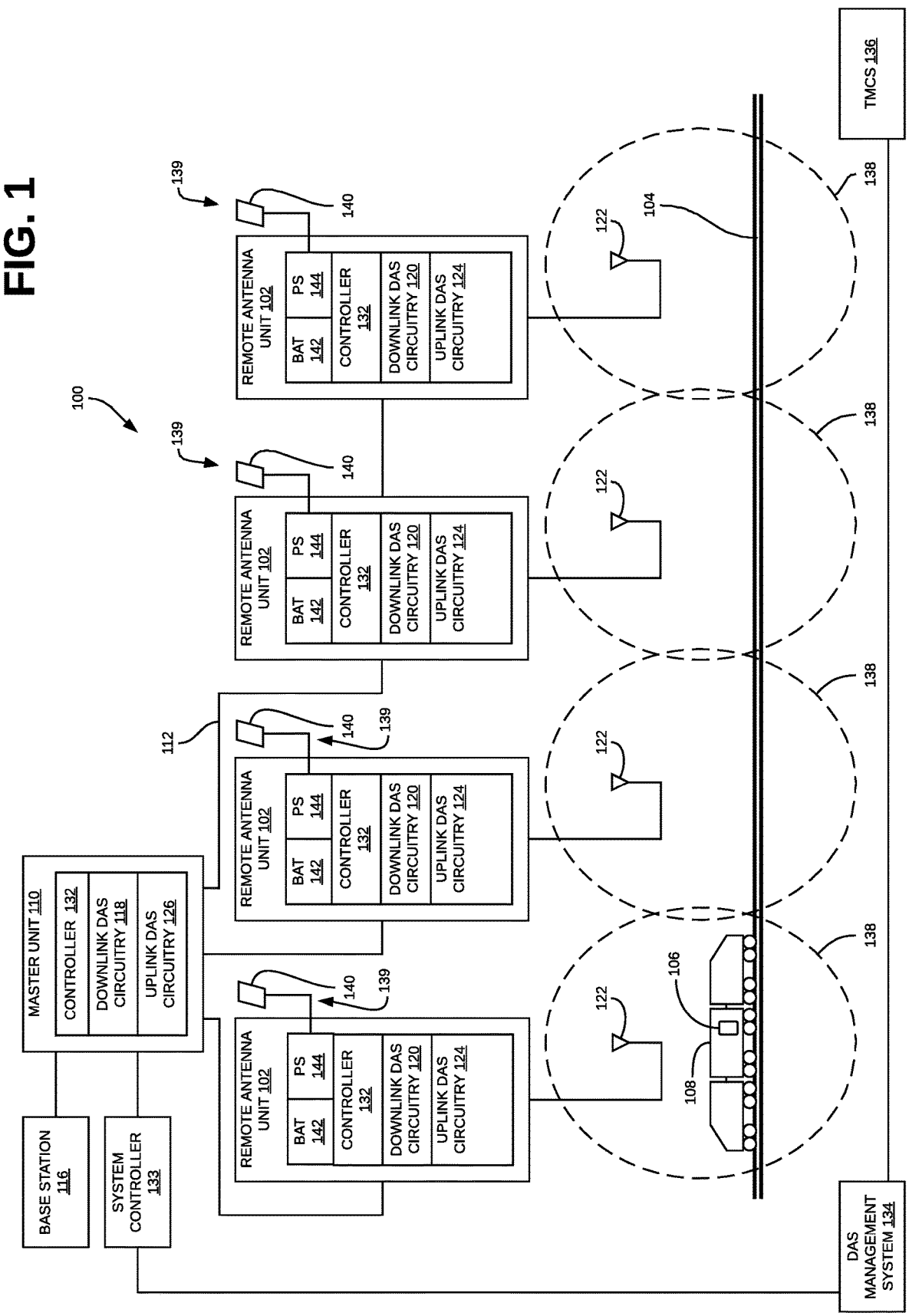

FIG. 1 is a block diagram illustrating one exemplary embodiment of a distributed antenna system 100 in which one or more of the remote antenna units 102 are configured to support an on-demand mode. The on-demand mode described here is suitable for use in applications where the remote antenna units 102 of the DAS 100 are deployed along railroad tracks 104 in order to improve wireless coverage for user equipment (UEs) 106 used by passengers of a train 108 that travels along the tracks 104.

The DAS 100 comprises one or more master units 110 that are communicatively coupled to one or more remote antenna units 102 via one or more cables 112. Each remote antenna unit 102 can be communicatively coupled directly to one or more of the master units 110 or indirectly via one or more other remote antenna units 110 and/or via one or more expansion (or other intermediary) unit (not shown).

Each master unit 110 is communicatively coupled to one or more base stations 116. In the exemplary embodiment shown in FIG. 1, each master unit 110 is coupled to one or more base stations 102 via one or more cables. In other embodiments, each master unit 110 can be coupled to the base stations 116 in other ways (for example, wirelessly using one or more donor antennas).

The base stations 116 can also be coupled to the master units 110 using a network of attenuators, combiners, splitters, amplifiers, filters, cross-connects, etc., (sometimes referred to collectively as a "point-of-interface" or "POI"). This network can be included in the master units 110 and/or can be separate from the master units 110. This is done so that, in the downlink, the desired set of RF channels output by the base stations 116 can be extracted, combined, and routed to the appropriate master units 110, and so that, in the upstream, the desired set of carriers output by the master units 110 can be extracted, combined, and routed to the appropriate interface of each base station 116. It is to be understood, however, that this is one example and that other embodiments can be implemented in other ways.

In general, each master unit 110 comprises downlink DAS circuitry 118 that is configured to receive one or more downlink signals from one or more base stations 116. Each base station downlink signal includes one or more radio frequency channels used for communicating in the downlink direction with user equipment 106 over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPRI") protocol, Open Radio Equipment Interface ("ORI") protocol, the Open Base Station Standard Initiative ("OBSAI") protocol, or other protocol).

The downlink DAS circuitry 118 in each master unit 110 is also configured to generate one or more downlink transport signals derived from one or more base station downlink signals and to transmit one or more downlink transport signals to one or more of the remote antenna units 102.

Each remote antenna unit 102 comprises downlink DAS circuitry 120 that is configured to receive the downlink transport signals transmitted to it from one or more master units 110 and to use the received downlink transport signals to generate and amplify one or more downlink radio frequency signals that are radiated from one or more coverage antennas 122 associated with that remote antenna unit 102 for reception by user equipment 106. In this way, the DAS 100 increases the coverage area for the downlink capacity provided by the base stations 116.

Also, each remote antenna unit 102 comprises uplink DAS circuitry 124 that is configured to receive one or more uplink radio frequency signals transmitted from the user equipment 106. These signals are analog radio frequency signals. The uplink DAS circuitry 124 in each remote antenna unit 102 is also configured to generate one or more uplink transport signals derived from the one or more remote uplink radio frequency signals and to transmit one or more uplink transport signals to one or more of the master units 110.

Each master unit 110 comprises uplink DAS circuitry 126 that is configured to receive the respective uplink transport signals transmitted to it from one or more remote antenna units 102 and to use the received uplink transport signals to generate one or more base station uplink radio frequency signals that are provided to the one or more base stations 116 associated with that master unit 110. Typically, this involves, among other things, combining or summing uplink signals received from multiple remote antenna units 102 in order to produce the base station signal provided to each base station 116. In this way, the DAS 100 increases the coverage area for the uplink capacity provided by the base stations 116.

In the example shown in FIG. 1, one of the remote antenna units 102 is coupled to the master unit 110 via one of the other remote antenna units 102 using a daisy chain topology.

The downlink DAS circuitry 118 and 120 and uplink DAS circuitry 124 and 126 in each master unit 110 and remote antenna unit 102, respectively, can comprise one or more appropriate connectors, attenuators, combiners, splitters, amplifiers, filters, duplexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink DAS circuitry 118 and 120 and uplink DAS circuitry 124 and 126 may share common circuitry and/or components.

The DAS 100 can use either digital transport, analog transport, or combinations of digital and analog transport for generating and communicating the transport signals between the master units 110 and the remote antenna units 102 (and any expansion units).

Each unit 110 and 102 in the DAS 100 also comprises a respective one or more local controllers 132. Each local controller 132 is implemented using one or more programmable processors that execute software that is configured to implement the various features described here as being implemented by the local controllers 132 in the respective unit 110 and 102. Each local controller 132 (more specifically, the various features described here as being implemented by the controller 132) (or portions thereof) can be implemented in other ways (for example, in a field programmable gate array (FPGA), application specific integrated circuit (ASIC), etc.).

In the exemplary embodiment shown in FIG. 1, the DAS 100 also includes a system controller 133 that is co-located with at least one of master units 110. The system controller 133 is configured to control the other nodes of the DAS 100 and to aggregate and communicate information (such as alarm and monitoring information and configuration comments). The system controller 133 is configured to communicate with a DAS management system 134.

Each of the nodes in the DAS 100 is configured to communicate with the system controller 133 and the DAS management system 134. In some implementations, an embedded management channel is provided in the transport signals communicated between the various nodes of the DAS 100 by which the DAS management system 134 and the system controller 133 are able to communicate with the nodes of the DAS 100 (including, without limitation, each of the remote antenna units 102). For example, in some such implementations, the embedded management channel is implemented as an embedded Ethernet channel so that management-plane communications between the nodes of the DAS 100 can be implemented using standard protocols typically used with Ethernet networks.

Also, in the exemplary embodiment shown in FIG. 1, the DAS management system 134 and/or the system controller 133 is communicatively coupled to one or more train management and control systems (TMCS) 136 that are used to monitor, manage, and control the operation of the trains 108 and tracks 104. For example, the DAS management system 134 and/or the system controller 133 can be communicatively coupled to one or more train management and control systems 136 over the Internet.

In some applications, at least some of the remote antenna units 102 of the DAS 100 are deployed outdoors to primarily provide improved wireless coverage for trains 108 passing on the railroad tracks 104. It is often the case that those remote antenna units 102 will be powered on full-time (that is, twenty-four hours a day, seven days a week or so-called "24/7") even though a train 108 will be in the coverage area 138 of the remote antenna unit 102 for only minutes each day. Operating such remote antenna units 102 at full power when not needed wastes power and unnecessarily contributes to macro cell interference and uplink noise.

In order to address such issues, at least some of the remote antenna units 102 are configured to be operated in an "on-demand" mode. When operating in such an on-demand mode, the remote antenna units 102 are configured to be operated in at least two operational states. One operational state comprises a "normal" or "full-power" operational state in which the downlink DAS circuitry 120 and uplink DAS circuitry 124 are fully powered on and used to repeat signals between one or more base stations 116 and UEs 106

The other operational state comprises a "low-power" or "muted" operational state in which the remote antenna unit 102 (and/or the DAS 100 more generally) is configured to not radiate (or radiate at a lower power level) one or more downlink frequency bands otherwise repeated by the remote antenna unit 102 and/or "mute" one or more uplink frequency bands otherwise repeated by the remote antenna unit 102. The remote antenna unit 102 can be configured to mute an uplink frequency band by not communicating to, the appropriate upstream node, uplink RF signals received at that remote antenna unit 102 for that uplink frequency band. The remote antenna unit 102 can also be configured to mute an uplink frequency band by communicating uplink RF signals received at that remote antenna unit 102 to the appropriate upstream node, where the upstream node is configured to not use those uplink RF signals in any combining performed by the upstream node. In this latter case, the upstream node can be configured to use the uplink signals received from that remote antenna unit 102 for other purposes (for example, for signal monitoring or analysis purposes). In the following description, for the sake of brevity, this other operational state may simply be referred to as the "low-power" operational state, though it is to be understand that this other operational state may involve muting one or more uplink frequency bands instead of, or in addition to, not radiating (or radiating at a lower power level) one or more downlink frequency bands.

As a consequence of not radiating (or radiating at a lower power level) one or more downlink frequency bands otherwise repeated by the remote antenna unit 102, the downlink DAS circuitry 120 (including the power amplifier) included in that remote antenna unit 102 can be powered off and/or operated in a low power or standby state (in whole or in part). Moreover, another consequence of not radiating (or radiating at a lower power level) one or more downlink frequency bands otherwise repeated by the remote antenna unit 102 is that the remote antenna unit 102 will not contribute to macro cell interference (where the remote antenna unit 102 does not radiate the one or more downlink frequency bands) or will contribute less to macro cell interference (in the case where the remote antenna unit 102 radiates the one or more downlink frequency bands at a lower power level).

Also, as a consequence of muting one or more uplink frequency bands otherwise repeated by the remote antenna unit 102, those uplink frequency bands will not contribute noise to the resulting combined signal. Also, where the remote antenna unit 102 is configured to mute an uplink frequency band by not communicating uplink signals for those frequency bands to the appropriate upstream node, the uplink DAS circuitry 124 included in that remote antenna unit 102 can be powered off and/or operated in a low power or standby state (in whole or in part).

Where the remote antenna unit 102 supports multiple frequency bands in the downlink, each of the multiple downlink frequency bands can be treated differently while the remote antenna unit 102 is operated in the low-power and/or muted operational state (including radiating that downlink band at a normal power level). Likewise, where the remote antenna unit 102 supports multiple frequency bands in the uplink, each of the multiple uplink frequency bands can be treated differently while the remote antenna unit 102 is operated in the low-power and/or muted operational state (including not muting the uplink band at all).

In some implementations, a remote antenna unit 102 will be operated in the normal, full-power operational state for only relatively short periods of time, followed by relatively long periods of being operated in the low-power and/or muted operational state. In implementations where operating the remote antenna unit 102 in the low-power and/or muted operational state results in significant power savings, it becomes possible to use a relatively "low-power" power source 139 in order to power the remote antenna unit 102. A relatively low-power power source 139 is one that is not typically able to supply sufficient power to power a remote antenna unit 102 if that remote antenna unit 102 were to be operated in the normal, full-power state full-time. One example of a low-power power source 139, which is illustrated in the exemplary embodiment shown in FIG. 1, makes use one or more solar panels 140. Other examples of low-power power sources 139 include line-power power sources (for example, line-power power sources used for providing line power over Plain Old Telephone System (POTS) twisted-pair telephone lines or line-power power sources used for providing line power using Power over Ethernet (PoE) over twisted-pair Ethernet cables). Such line-power power sources 139 may already exist near the remote antenna unit 102 (for example, to provide communication connectivity to one or more devices near the remote antenna unit 102 or to the remote antenna unit 102 itself). Also, multiple low-power power sources 139 can be used in combination. As shown in FIG. 1, a remote antenna unit 102 can be configured to use one or more low-power power sources 139 (one or more solar panels 140 in the embodiment shown in FIG. 1) and one or more batteries 142 that are coupled to the power supply circuitry 144 of the remote antenna unit 102. The power supply circuitry 144 in the remote antenna unit 102 is configured to use the one or more low-power power sources 139 (the one or more solar panels 140 in the embodiment shown in FIG. 1) to produce electrical power, to store electrical power in the one or more batteries 142 when the remote antenna unit 102 is operated in the low-power and/or muted operational state, and to use electrical power stored in the one or more batteries 142 when the remote antenna unit 102 is operated in the normal operational state. By using a low-power power source 139 in this way, it is possible to avoid having to provide the remote antenna unit 102 with an external "high-power" power line.

In some implementations, while operated in the low-power and/or muted operational state, some of the components in downlink and uplink DAS circuitry 120 and 124 of each remote antenna unit 102 are not fully powered off but instead are operated in a standby state (for example, because the time required for such components to transition from between a fully powered off state to a normal operational state is too long). It is understood that even while a remote antenna unit 102 is operated in the low-power and/or muted operational state, the remote antenna unit 102 is configured to maintain its management-plane connectivity with the DAS management system 134. Also, it is understood that even while a remote antenna unit 102 is operated in the low-power and/or muted operational state, the remote antenna unit 102 is configured to communicate any downlink and uplink transport signals between any upstream and downstream DAS nodes for which it serves as an intermediary node. For example, in the example shown in FIG. 1, one of the remote antenna units 102 is subtended from another one of the remote antenna units 102 in a daisy-chain configuration. The intermediary remote antenna unit is configured so that, while it is operated in the low-power and/or muted operational state, it still receives downlink transport signals from its upstream node (a master unit 110 in this example) and transmits them to the subtended remote antenna unit and receives uplink transport signals from the subtended remote antenna unit and transmits them to its upstream node (the master unit 110).

Each remote antenna unit 102 (and the functionality described here as being included therein), as well as the various nodes of the DAS 100 (including the DAS management system 134) and the TMCS 136 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors or configuring a programmable device. Such hardware or software (or portions thereof) can be implemented in other ways (for example, in an application specific integrated circuit (ASIC), etc.). Each remote antenna unit 102, (and the various nodes of the DAS 100 (including the DAS management system 134), and the TMCS 136 more generally) can be implemented in other ways.

Figure 2:
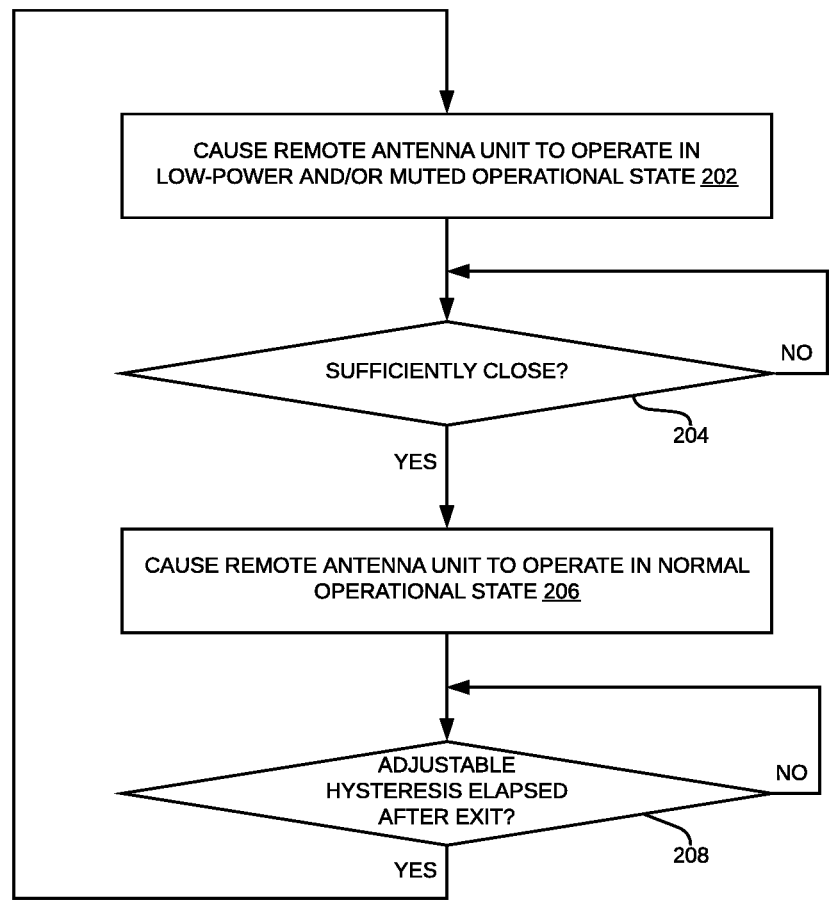

FIG. 2 comprises a high-level flowchart illustrating one exemplary embodiment of a method 200 of operating a distributed antenna system 100 to provide improved coverage for a train 108 traveling on a train track 104. The embodiment of method 200 shown in FIG. 2 is described here as being implemented using the DAS 100 described above in connection with FIG. 1, though it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

The exemplary embodiment of method 200 shown in FIG. 2 is performed for each remote antenna unit 102 that is deployed primarily to provide improved wireless coverage for trains 108 traveling along the train track 104. Method 200 can be performed separately for each individual remote antenna unit 102, or a single instance of method 200 can be performed for multiple remote antenna units 102 as a configurable group (for example, where it is desirable to have the group of remote antenna units 102 transition between the two operational states as a group). For ease of explanation, method 200 is described here in connection with FIG. 2 as being performed for an individual remote antenna unit 102, which is referred to here as the "current" remote antenna unit 102. However, it is to be understood that method 200 can be performed for a configurable set of one or more remote antenna units 102.

In general, method 200 is used to implement an on-demand mode in which each such remote antenna unit 102 transitions between two operational states—the low-power and/or muted operational state and the normal operational state. This is done in connection with providing improved wireless coverage to trains 108 travelling along the railroad track 104.

Method 200 comprises causing the current remote antenna unit 102 to operate in the low-power and/or muted operational state (block 202).

In this exemplary embodiment, the low-power and/or muted operational state is the "default" operational state. For example, the current remote antenna unit 102 can be configured so that it will enter the low-power and/or muted operational state when it first powers on or when its configuration is changed to be the on-demand mode (if each such remote antenna unit 102 was not configured to be in the on-demand mode prior to such configuration change).

Method 200 further comprises, while the current remote antenna unit 102 is operating in the low-power and/or muted operational state, determining if a train 108 is sufficiently close to the coverage area 138 associated with the current remote antenna unit 102 to trigger a change in an operational state of the current remote antenna unit 102 (checked in block 204) and, in response to a determination that this is the case, causing the current remote antenna unit 102 to transition to being operated in the normal operational state (block 206). Otherwise, the current remote antenna unit 102 remains in the low-power and/or muted operational state. As noted above, when the current remote antenna unit 102 is operated in the normal operational state, the downlink DAS circuitry 120 and uplink DAS circuitry 124 in the current remote antenna unit 102 are fully powered on and used to repeat signals between one or more base stations 116 and the UEs 106.

In general, the train 108 is "sufficiently close" to the coverage area 138 for the current remote antenna unit 102 when the time it will take the train 108 to travel along the tracks 104 and first enter the coverage area 138 is equal to the time required for the remote antenna unit 102 to transition from the low-power and/or muted operational state to the normal operational state. In some examples, the low-power and/or muted operational state comprises a "hot standby" state from which the remote antenna unit 102 can transition to the normal operational state nearly instantaneously (for example, in less than one second). In such examples, the train 108 is first "sufficiently close" to the coverage area 138 for the remote antenna unit 102 at the point the train 108 enters the coverage area 138. In some other examples, the low-power and/or muted operational state comprises a "deep standby" state from which the remote antenna unit 102 requires more time to transition to the normal operational state (for example, more than one second). For example, where the remote antenna unit 102 requires two seconds to transition to the normal operational state, the train 108 is first "sufficiently close" to the coverage area 138 for the remote antenna unit 102 at the point along the tracks 104 when the train 108 will first enter the coverage area 138 in two seconds.

Method 200 further comprises, while the current remote antenna unit 102 is operating in the normal operational state, determining if an adjustable hysteresis period has elapsed since the train 108 has exited the coverage area 138 associated with the current remote antenna unit 102 (checked in block 208) and, in response to a determination that this is the case, causing the current remote antenna unit 102 to transition to being operated in the low-power and/or muted operational state (looping back to block 202). Otherwise, the current remote antenna unit 102 remains in the normal operational state.

In the embodiment shown in FIG. 2, the processing associated with block 208 is configured in order to implement an adjustable hysteresis. The adjustable hysteresis can be used to reduce the likelihood of the current remote antenna unit 102 quickly switching back-and-forth (that is, "ping-ponging") between the low-power and/or muted operational state and the normal operational state. However, it is to be understood that the adjustable hysteresis need not be used. In such a case, the processing associated with block 208 is configured to determine if the current train 108 has exited the coverage area 138 associated with the current remote antenna unit 102.

By implementing an on-demand mode in the current remote antenna unit 102 as described above, the current remote antenna unit 102 will generally be operated in the normal, full-power state only during those times when a train 108 is expected to be in the associated coverage area 138. By doing this, in implementations where operating the current remote antenna unit 102 in the low-power and/or muted operational state results in significant power savings, it is possible to avoid the waste of power that would otherwise result from operating the current remote antenna unit 102 in the normal, full-power state full-time. Also, in implementations where operating the current remote antenna unit 102 in the low-power and/or muted operational state results in significant power savings, because the current remote antenna unit 102 is operated in the normal, full-power operational state for only relatively short periods of time, followed by relatively long periods of being operated in the low-power and/or muted operational state, it becomes possible to use a relatively low-power power source 139 to power the remote antenna unit 102, which makes it possible to avoid having to provide the remote antenna unit 102 with an external "high-power" power line.

Moreover, in some implementations, the current remote antenna unit 102, when operated in the low-power and/or muted operational state, does not radiate (or radiates at a lower power level) one or more downlink frequency bands otherwise repeated by the current remote antenna unit 102 and will not contribute to macro cell interference (where the remote antenna unit 102 does not radiate the one or more downlink frequency bands) or will contribute less to macro cell interference (in the case where the remote antenna unit 102 radiates the one or more downlink frequency bands at a lower power level). Furthermore, in some implementations, the current remote antenna unit 102, when operated in the low-power and/or muted operational state, mutes one or more uplink frequency bands otherwise repeated by the current remote antenna unit 102 and, as a consequence, uplink signals from the current remote antenna unit 102 will not be combined by the relevant upstream node for those uplink frequency bands and will not contribute noise to the resulting combined uplink signals produced at the upstream node for those uplink frequency bands.

Figure 3:
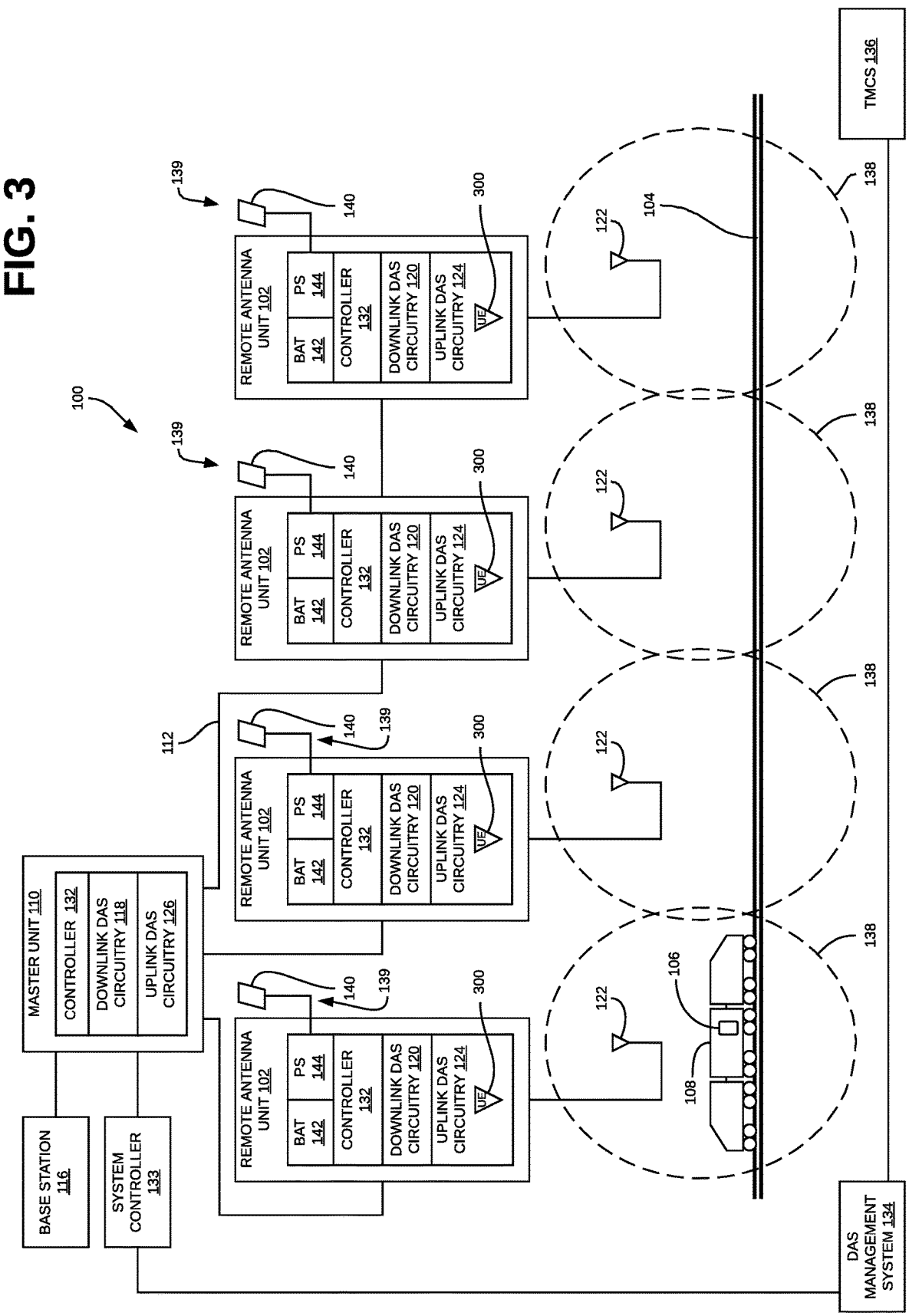
FIG. 3 is a block diagram illustrating one example of how method can be implemented in the distributed antenna system of FIG. 1.

FIG. 3 is a block diagram illustrating one example of how method 200 can be implemented in the distributed antenna system 100 of FIG. 1. In the example shown in FIG. 3, each of the remote antenna units 102 that implements the on-demand mode is configured so that at least some of the uplink DAS circuitry 124 is still used to monitor uplink signals received from any UEs 106 located in the associated coverage area 138 while the remote antenna unit 102 operates in the low-power operational state.

More specifically, in this example, the uplink DAS circuitry 124 comprises a UE receiver 300 that is configured to receive signals in the relevant uplink RF channels repeated by that remote antenna unit 102. These uplink RF channels include the channels in which any transmissions from UEs 106 in a train 108 will occur.

Each such remote antenna unit 102 is configured so that while the remote antenna unit 102 operates in the low-power operational state, the UE receiver 300 (and related processing circuitry including, for example, the local controller 132) is powered on to receive and process signals in the relevant uplink RF channels.

The received signals are processed in order to determine information indicative of the proximity of the train 108 to the remote antenna unit 102. This information is also referred to here as "train proximity information" or just "proximity information." Examples of train proximity information include information indicative of how far the train 108 or UEs 106 are away from the remote antenna unit 102, the current geographic position of the train 108 or the UEs 106, and/or the speed at which the train 108 or the UEs 106 are moving.

The proximity information determined from processing the received uplink signals can be used to make the determination as to whether a train 108 is sufficiently close to the coverage area 138 associated with the remote antenna unit 102 to trigger a change in an operational state of the remote antenna unit 102. Likewise, the proximity information determined from processing the received uplink signals can be used to make the determination as to whether the train 108 has exited the coverage area 138 associated with the remote antenna unit 102.

For example, the processing of the received signals can involve measuring or otherwise determining a value (such as a received power level) in or for the frequency band in which transmissions from the UEs 106 are communicated. In such an example, the determination as to whether a train 108 is sufficiently close to the coverage area 138 associated with the remote antenna unit 102 to trigger a change in an operational state of the remote antenna unit 102 can be made by comparing the current received power level value to a first configurable threshold value. The first configurable threshold value is set so that if there is one or more UEs 106 sufficiently close to the associated coverage area 138 (for example, because the UEs 106 are being used by passengers of a train 108 that is sufficiently close to the coverage area 138), the current received power level value will be above the first configurable threshold value. This condition—that the current received power level value is above the first configurable threshold value—is used to indicate that there is a train 108 that is sufficiently close to the coverage area 138 associated with the remote antenna unit 102.

Likewise, in this example, the determination as to whether a train 108 has exited the coverage area 138 associated with the remote antenna unit 102 can be made by comparing the current received power level value to a second configurable threshold value. The second configurable threshold value is set so that if there are no UEs 106 within the associated coverage area 138 (for example, because no train 108 is within the coverage area 138), the current received power level value will be below the second configurable threshold value. This condition—that the current received power level value is below the second configurable threshold value—is used to indicate that the train 108 has exited the coverage area 138 associated with the remote antenna unit 102.

In other examples, one or more attributes of the received signals (including, for example, received power level values as well as other attributes) are processed in other ways using conventional proximity determination techniques in order to determine the proximity information. In other examples, the processing of the received signals includes demodulating and decoding one or more of UE transmissions in order to obtain information determined by the UEs 106 (such as how far away each UE 106 or train 108 is from the remote antenna unit 102, the geographic position of each UE 106 or train 108, or the speed at which each UE 106 or train 108 is travelling). The obtained information can then be processed using conventional proximity determination techniques in order to determine proximity information.

The processing of the received signals can be performed entirely within the remote antenna unit 102 (for example, where such processing is performed at least in part by the local controller 132 in that remote antenna unit 102) or at least in part by another node in the DAS 100 (for example, by the system controller 133 or DAS management system 134) or elsewhere (for example, by the TMCS 136).

Also, the determination as to whether a train 108 is sufficiently close to the coverage area 138 associated with the remote antenna unit 102 to trigger a change in an operational state of the remote antenna unit 102 can be made entirely within the remote antenna unit 102 (for example, where such determination is made at least in part by the local controller 132 in that remote antenna unit 102) or made at least in part by another node in the DAS 100 (for example, by the system controller 133 or DAS management system 134) or elsewhere (for example, by the TMCS 136). Likewise, the determination that a train 108 has exited the coverage area 138 associated with the remote antenna unit 102 can be made entirely within the remote antenna unit 102 (for example, where such determination is made at least in part by the local controller 132 in that remote antenna unit 102) or made at least in part by another node in the DAS 100 (for example, by the system controller 133 or DAS management system 134) or elsewhere (for example, by the TMCS 136).

In operation, while a remote antenna unit 102 is operating in the low-power operational state, when there is no train 108 sufficiently close to the coverage area 138 associated with such a remote antenna unit 102 to trigger a change in an operational state of the remote antenna unit 102, the proximity information determined from any signals received in the relevant uplink RF channels repeated by that remote antenna unit 102 will reflect that fact and, as a result, the remote antenna unit 102 will be operated in the low-power operational state. When a train 108 containing one or more active UEs 106 moves along the tracks 104 so that it is sufficiently close to the associated coverage area 138 to trigger a change in an operational state of the remote antenna unit 102, the proximity information determined from any received signals will reflect that fact and will result in the remote antenna unit 102 being transitioned to operating in the normal operational state. While the train 108 remains in the associated coverage area 138, the proximity information determined from any received signals will reflect that fact and, as a result, the remote antenna unit 102 will continue to be operated in the normal operational state. When the train 108 moves out of the coverage area 138, the proximity information determined from any received signals will reflect that fact. In response to the adjustable hysteresis period having elapsed with the current proximity information indicating that the train 108 has moved out of the coverage area 138, the remote antenna unit 102 will be transitioned to operating in the low-power operational state.

Other implementations of the example shown in FIG. 3 can be implemented in other ways.

Figure 4:
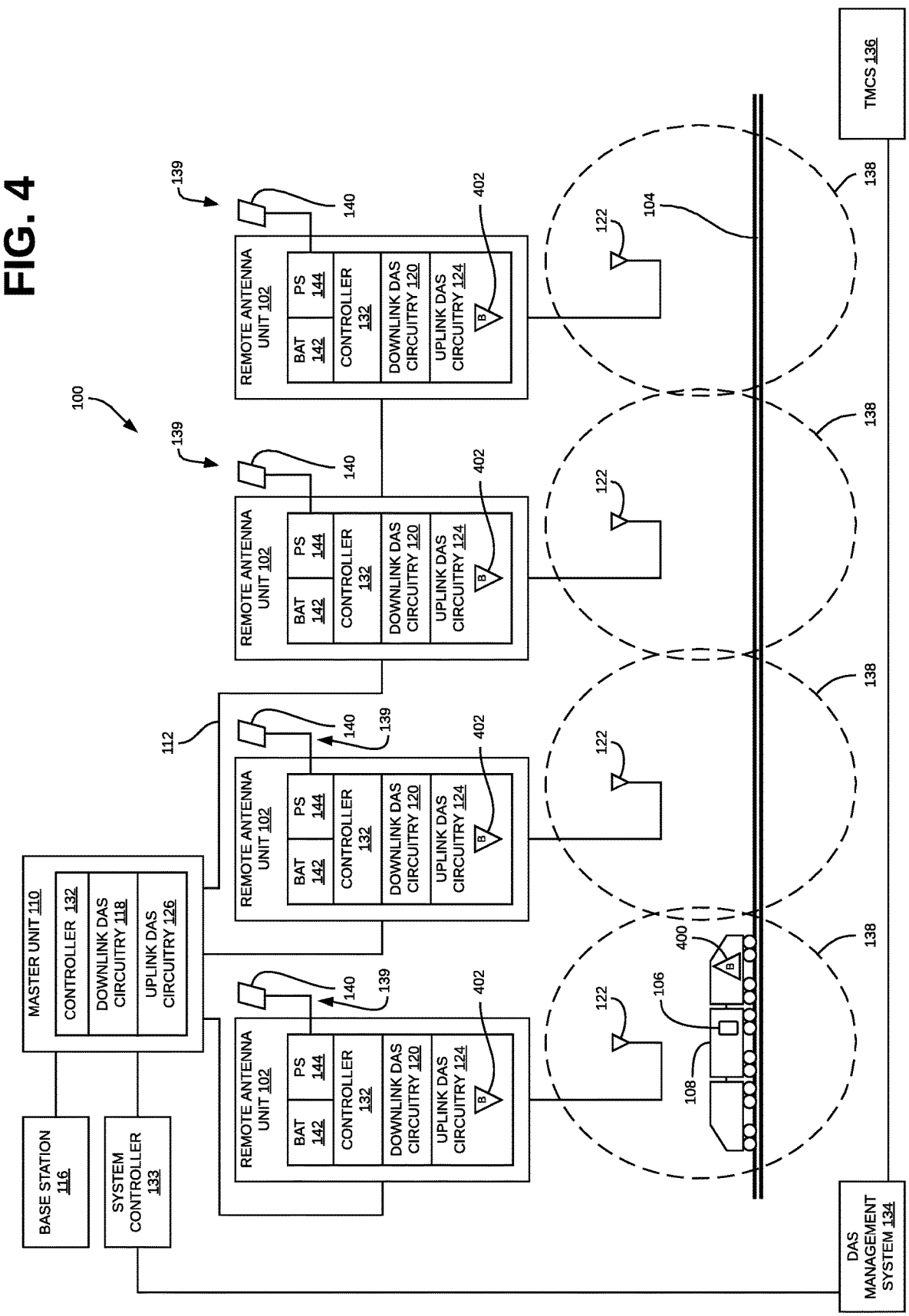
FIG. 4 is a block diagram illustrating another example of how method can be implemented in the distributed antenna system of FIG. 1.

FIG. 4 is a block diagram illustrating another example of how method 200 can be implemented in the distributed antenna system 100 of FIG. 1.

In the example shown in FIG. 4, a train beacon transmitter 400 is deployed in each train 108 that travels along the tracks 104. The train beacon transmitter 400 continuously transmits a beacon signal.

Each of the remote antenna units 102 that implements the on-demand mode comprises a train beacon receiver 402 that is coupled to the local controller 132 in that remote antenna unit 102. The train beacon receiver 402 is configured to receive train beacon transmissions from train beacon transmitters 400.

Each such remote antenna unit 102 is configured so that while the remote antenna unit 102 operates in the low-power operational state, the train beacon receiver 402 (and related processing circuitry including, for example, the local controller 132) is powered on to receive and process train beacon transmissions from any nearby train beacon transmitters 400 deployed in any nearby trains 108.

The received train beacon transmissions are processed in order to determine information indicative of the proximity of the train 108 to the remote antenna unit 102. As noted above, examples of train proximity information include information indicative of how far the train 108 or UEs 106 are away from the remote antenna unit 102, the current geographic position of the train 108 or the UEs 106, and/or the speed at which the train 108 or the UEs 106 are moving.

The proximity information determined from processing the received train beacon transmissions can be used to make the determination as to whether a train 108 is sufficiently close to the coverage area 138 associated with the remote antenna unit 102 to trigger a change in an operational state of the remote antenna unit 102. Likewise, the proximity information determined from processing the received train beacon transmissions can be used to make the determination as to whether the train 108 has exited the coverage area 138 associated with the remote antenna unit 102.

In one example, the beacon signal comprises a continuous wave (CW) signal transmitted at predetermined power level. In this example, when a train 108 containing a train beacon transmitter 400 approaches a remote antenna unit 102, the train beacon receiver 402 with receive the CW signal transmitted by the train beacon transmitter 400. In this example, the processing of the received train beacon transmissions involves measuring or otherwise determining a received power level for the received CW signal. In this example, the determination as to whether a train 108 is sufficiently close to the coverage area 138 associated with the remote antenna unit 102 to trigger a change in an operational state of the remote antenna unit 102 and the determination that a train 108 has exited the coverage area 138 associated with the remote antenna unit 102 can be made in the same general manner as is done in the example described above in connection with FIG. 3, except that the current received power level value is for train beacon transmissions received by the train beacon receiver 402 instead of UE transmissions received by the UE receiver 300.

In other examples, one or more attributes of the received train beacon transmissions (including, for example, received power level values as well as other attributes) are processed in other ways using conventional proximity determination techniques in order to determine the proximity information.

In other examples, the beacon signal is used to communicate information related to the train 108 (such as a train number or other train identifier, the length of the train 108, the geographic position of the train 108 (for example, as determined by a GPS or similar positioning determining unit on the train 108), a relative position of the particular train car in which the train beacon transmission 400 is located, a speed of the train (for example, as measured by sensors on the train 108), etc.). Such information about the train 108 can be encoded and modulated on a carrier. The encoded and modulated signal can then be transmitted by the train beacon transmitter 400 as the train beacon.

In such examples, the processing of the received train beacon transmissions can include demodulating and decoding the received signal in order to obtain the information communicated using the train beacon transmissions. The obtained information can then be processed using conventional proximity determination techniques in order to determine proximity information.

The processing of the received train beacon transmissions can be performed entirely within the remote antenna unit 102 (for example, where such processing is performed at least in part by the local controller 132 in that remote antenna unit 102) or at least in part by another node in the DAS 100 (for example, by the system controller 133 or DAS management system 134) or elsewhere (for example, by the TMCS 136).

Also, the determination as to whether a train 108 is sufficiently close to the coverage area 138 associated with the remote antenna unit 102 to trigger a change in an operational state of the remote antenna unit 102 can be made entirely within the remote antenna unit 102 (for example, where such determination is made at least in part by the local controller 132 in that remote antenna unit 102) or made at least in part by another node in the DAS 100 (for example, by the system controller 133 or DAS management system 134) or elsewhere (for example, by the TMCS 136). Likewise, the determination that a train 108 has exited the coverage area 138 associated with the remote antenna unit 102 can be made entirely within the remote antenna unit 102 (for example, where such determination is made at least in part by the local controller 132 in that remote antenna unit 102) or made at least in part by another node in the DAS 100 (for example, by the system controller 133 or DAS management system 134) or elsewhere (for example, by the TMCS 136).

In operation, while a remote antenna unit 102 is operating in the low-power operational state, when there is no train 108 sufficiently close to the coverage area 138 associated with such a remote antenna unit 102 to trigger a change in an operational state of the remote antenna unit 102, the proximity information determined from any received train beacon transmissions will reflect that fact and, as a result, the remote antenna unit 102 will be operated in the low-power operational state. When a train 108 containing a train beacon transmitter 400 moves along the tracks 104 so that it is sufficiently close to the associated coverage area 138 to trigger a change in an operational state of the remote antenna unit 102, the proximity information determined from any received train beacon transmissions will reflect that fact and will result in the remote antenna unit 102 being transitioned to operating in the normal operational state. While the train 108 remains in the associated coverage area 138, the proximity information determined from any received train beacon transmissions will reflect that fact and, as a result, the remote antenna unit 102 will continue to be operated in the normal operational state. When the train 108 moves out of the coverage area 138, the proximity information determined from any received train beacon transmissions will reflect that fact. In response to the adjustable hysteresis period having elapsed with the current proximity information indicating that the train 108 has moved out of the coverage area 138, the remote antenna unit 102 will be transitioned to operating in the low-power operational state.

Other implementations of the example shown in FIG. 4 can be implemented in other ways.

Figure 5:
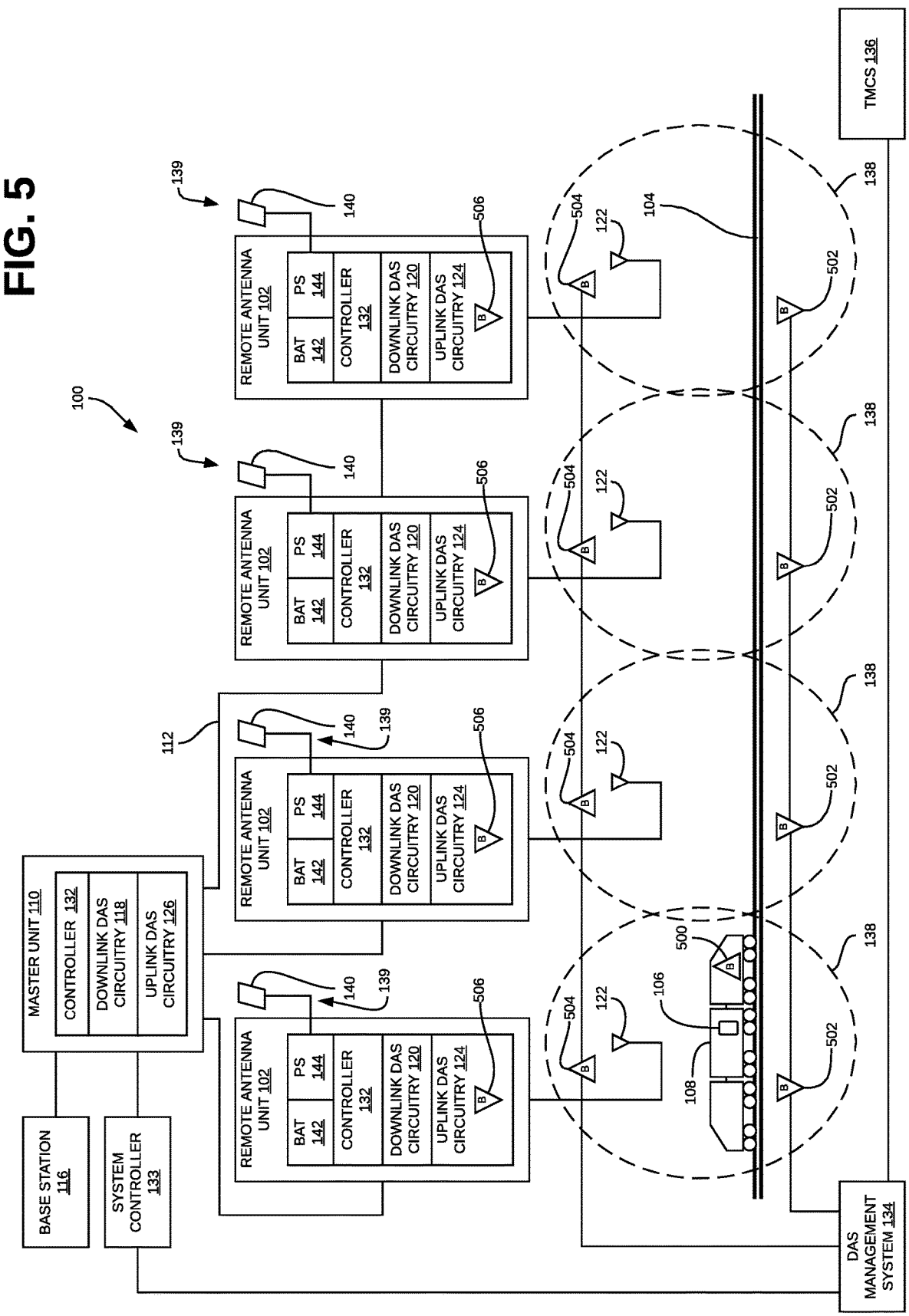
FIG. 5 is a block diagram illustrating another example of how method can be implemented in the distributed antenna system of FIG. 1.

FIG. 5 is a block diagram illustrating another example of how method 200 can be implemented in the distributed antenna system 100 of FIG. 1.

In the example shown in FIG. 5, a train beacon transmitter 500 is deployed in each train 108 that travels along the tracks 104. The train beacon transmitter 500 continuously transmits a train beacon signal. In this example, train beacon receivers 502 that are separate from the remote antenna units 102 are deployed in and around the tracks 104. Each of the train beacon receivers 502 is communicatively coupled to the DAS management system 134 (for example, via one or more gateways or other intermediary device, networks, or services). Each train beacon receiver 502 is positioned within the coverage area 138 of one or more of the remote antenna units 102. Each train beacon receiver 502 can be powered in any suitable way—for example, lined-powered using power delivered via the communication lines used to couple the receiver 502 to the DAS management system 134), battery powered, solar powered, and/or powered via the main power grid.

As with the example described above in connection with FIG. 4, in the example shown in FIG. 5, the received train beacon transmissions are processed in order to determine information indicative of the proximity of the train 108 to the remote antenna unit 102 (by the train beacon receiver 502 and/or by another node such as the DAS management system 134). Where such processing is performed entirely by the train beacon receiver 502, the receiver 502 periodically transmits the resulting proximity information to the DAS management system 134. Where such processing is performed at least in part by another node, the receiver 502 periodically transmits the received train beacon transmissions (and/or information derived therefrom) to that other node for processing thereby. The other node then periodically transmits the resulting proximity information to the DAS management system 134 (if that other node is not the DAS management system 134).

In the example shown in FIG. 5, DAS beacon transmitters 504 that are separate from the remote antenna units 102 are deployed in and around the tracks 104. Each of the DAS beacon transmitters 504 is communicatively coupled to the DAS management system 134 (for example, via one or more gateways or other intermediary device, networks, or services). Each DAS beacon transmitter 504 is positioned within the coverage area 138 of one or more of the remote antenna units 102. Each DAS beacon transmitter 504 can be powered in any suitable way—for example, lined-powered using power delivered via the communication lines used to couple the transmitter 504 to the DAS management system 134), battery powered, solar powered, and/or powered via the main power grid.

Each DAS beacon transmitter 504 is configured to transmit a DAS beacon signal when instructed to do so by the DAS management system 134.

Each of the remote antenna units 102 that implements the on-demand mode comprises a DAS beacon receiver 506 that is coupled to the local controller 132 in that remote antenna unit 102. The DAS beacon receiver 506 is configured to receive any DAS beacon transmissions from the DAS beacon transmitter 504 that is deployed in the coverage area 138 of the remote antenna unit 102. Each such remote antenna unit 102 is configured so that while the remote antenna unit 102 operates in the low-power operational state the DAS beacon receiver 506 is powered on to receive any DAS beacon transmissions from the DAS beacon transmitter 504 deployed in the associated coverage area 138. The local controller 132 in the remote antenna unit 102 can be configured to determine which operational state to operate the remote antenna unit 102 in based on whether or not the DAS beacon receiver 506 in that remote antenna unit 102 is currently receiving a DAS beacon transmission. For example, the local controller 132 in the remote antenna unit 102 can be configured to operate the remote antenna unit 102 in the low-power operational state when the DAS beacon receiver 506 in that remote antenna unit 102 is not currently receiving a DAS beacon transmission and to operate the remote antenna unit 102 in the normal operational state when the DAS beacon receiver 506 in that remote antenna unit 102 is currently receiving a DAS beacon transmission. That is, the DAS management 134 can cause a remote antenna unit 102 to operate in either of operational states based on whether or not it causes the DAS beacon transmitter 504 that is deployed in the coverage area 138 of that remote antenna unit 102 to transmit a DAS beacon.

The DAS management system 134 can be configured to make the determination as to whether a train 108 is sufficiently close to the coverage area 138 associated with each remote antenna unit 102 to trigger a change in an operational state of the remote antenna unit 102 and to make the determination that a train 108 has exited the coverage area 138 associated with each remote antenna unit 102 based on the proximity information determined from processing the train beacon transmissions received by the train beacon receiver 502 in that coverage area 138.

In operation, while a remote antenna unit 102 is operating in the low-power operational state, when there is no train 108 sufficiently close to the coverage area 138 associated with such a remote antenna unit 102 to trigger a change in an operational state of the remote antenna unit 102, the proximity information determined from any received train beacon transmissions will reflect that fact and, as a result, the DAS management system 134 will cause the DAS beacon transmitter 504 deployed in that coverage area 138 to not transmit a DAS beacon. As a result, the DAS beacon receiver 506 in that remote antenna unit 102 will not receive any DAS beacon and the local controller 132 in the remote antenna unit 102 will continue to have the remote antenna unit 102 operate in the low-power operational state.

When a train 108 containing a train beacon transmitter 500 moves along the tracks 104 so that it is sufficiently close to the associated coverage area 138 to trigger a change in an operational state of the remote antenna unit 102, the proximity information determined from any received train beacon transmissions will reflect that fact. In response, the DAS management system 134 will cause the DAS beacon transmitter 504 deployed in that coverage area 138 to transmit a DAS beacon. In response to the DAS beacon receiver 506 in that remote antenna unit 102 receiving the DAS beacon transmission, the local controller 132 in the remote antenna unit 102 will cause the remote antenna unit 102 to transition to operating in the normal operational state.

While the train 108 remains in the associated coverage area 138, the proximity information determined from any received train beacon transmissions will reflect that fact. When the train 108 moves out of the coverage area 138, the proximity information determined from any received train beacon transmissions will reflect that fact. Then, in response to the adjustable hysteresis period elapsing with the current proximity information indicating that the train 108 has moved out of the coverage area 138, the DAS management system 134 will cause the DAS beacon transmitter 504 deployed in that coverage area 138 to not transmit a DAS beacon. In response to the DAS beacon receiver 506 in that remote antenna unit 102 not receiving any DAS beacon transmission, the local controller 132 in the remote antenna unit 102 will cause the remote antenna unit 102 to transition to operating in the low-power operational state.

Other implementations of the example shown in FIG. 5 can be implemented in other ways.

Figure 6:
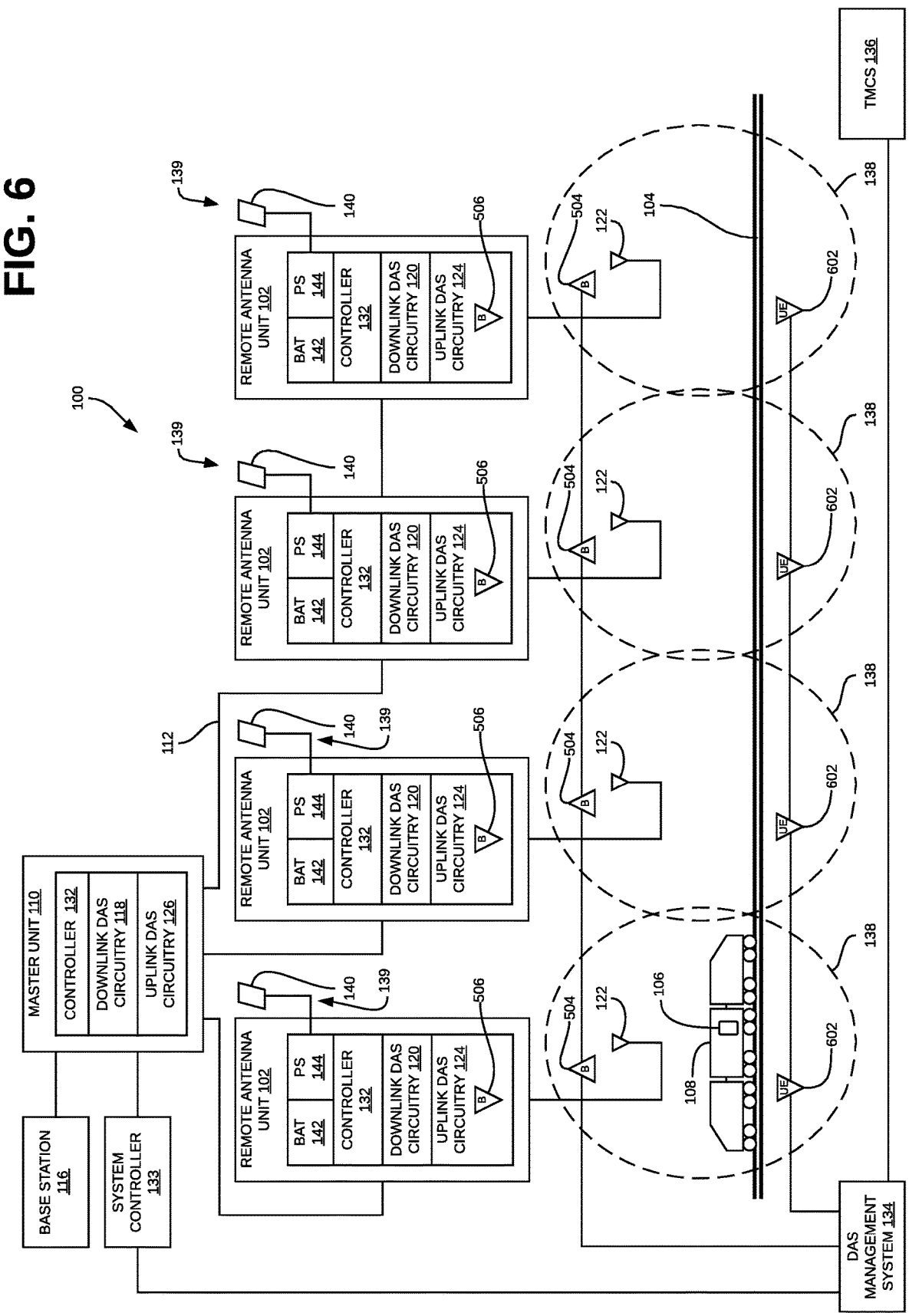
FIG. 6 is a block diagram illustrating another example of how method can be implemented in the distributed antenna system of FIG. 1.

FIG. 6 is a block diagram illustrating another example of how method 200 can be implemented in the distributed antenna system 100 of FIG. 1.

The example shown in FIG. 6 is similar to the example shown in FIG. 5 except that signals received in the relevant uplink RF channels repeated by the remote antenna unit 102 (which include the channels in which any transmissions from UEs 106 in a train 108 will occur) are processed in order to determine the proximity information that is used to determine when a train 108 is sufficiently close to the coverage area 138 associated with a remote antenna unit 102 to trigger a change in an operational state of the remote antenna unit 102 and to determine that a train 108 has exited the coverage area 138 associated with the remote antenna unit 102. Signals received in the relevant uplink RF channels repeated by the remote antenna unit 102 are processed in order to determine the proximity information instead of transmissions from train beacon transmitters 500 deployed in the trains 108. In the example shown in FIG. 6, UE receivers 602 that are separate from the remote antenna units 102 are deployed in and around the tracks 104. Each of the UE receivers 602 is communicatively coupled to the DAS management system 134 (for example, via one or more gateways or other intermediary device, networks, or services). Each UE receiver 602 is positioned within the coverage area 138 of one or more of the remote antenna units 102. Each UE receiver 602 can be powered in any suitable way—for example, lined-powered using power delivered via the communication lines used to couple the receiver 602 to the DAS management system 134), battery powered, solar powered, and/or powered via the main power grid.

The signals received by the UE receiver 602 are processed in order to determine information indicative of the proximity of the train 108 to the remote antenna unit 102 (for example, processed by the UE receiver 602 and/or by another node such as the DAS management system 134). Where such processing is performed entirely by the UE beacon receiver 602, the receiver 602 periodically transmits the resulting proximity information to the DAS management system 134. Where such processing is performed at least in part by another node, the receiver 602 periodically transmits the received signals (and/or information derived therefrom) to that other node for processing thereby. The other node then periodically transmits the resulting proximity information to the DAS management system 134 (if that other node is not the DAS management system 134).

In this example, DAS beacon transmitters 504 that are separate from the remote antenna units 102 are deployed in and around the tracks 104, and each of the remote antenna units 102 that implements the on-demand mode comprises a DAS beacon receiver 506 that is coupled to the local controller 132 in that remote antenna unit 102. The DAS beacon transmitters 504 and DAS beacon receivers 506 are implemented as described above in connection with FIG. 5, the description of which is not repeated here for the sake of brevity.

The DAS management system 134 can be configured to make the determination as to whether a train 108 is sufficiently close to the coverage area 138 associated with each remote antenna unit 102 to trigger a change in an operational state of the remote antenna unit 102 and to make the determination that a train 108 has exited the coverage area 138 associated with each remote antenna unit 102 based on the proximity information determined from processing the signals received by the UE receiver 602 in that coverage area 138. These determinations can be made in the same general manner as is done in the example described above in connection with FIG. 5, except that the proximity information is determined by processing signals received by the UE receiver 602 instead of proximity information determined by processing train beacon transmissions received by the train beacon receiver 502.

Other implementations of the example shown in FIG. 6 can be implemented in other ways.

In the examples shown in FIGS. 5 and 6, the DAS management system 134 causes each remote antenna unit 102 to either operate in the normal operational state or the low-power operational state by causing the associated DAS beacon transmitter 504 to either transmit a DAS beacon or not transmit a DAS beacon, respectively. However, the DAS management system 134 can instead directly communicate with the local controller 132 in each remote antenna unit 102 in order to cause the remote antenna unit 102 to either operate in the normal operational state or the low-power operational state (for example, by sending messages over an embedded management channel communicated between the various nodes of the DAS 100).

Figure 7:
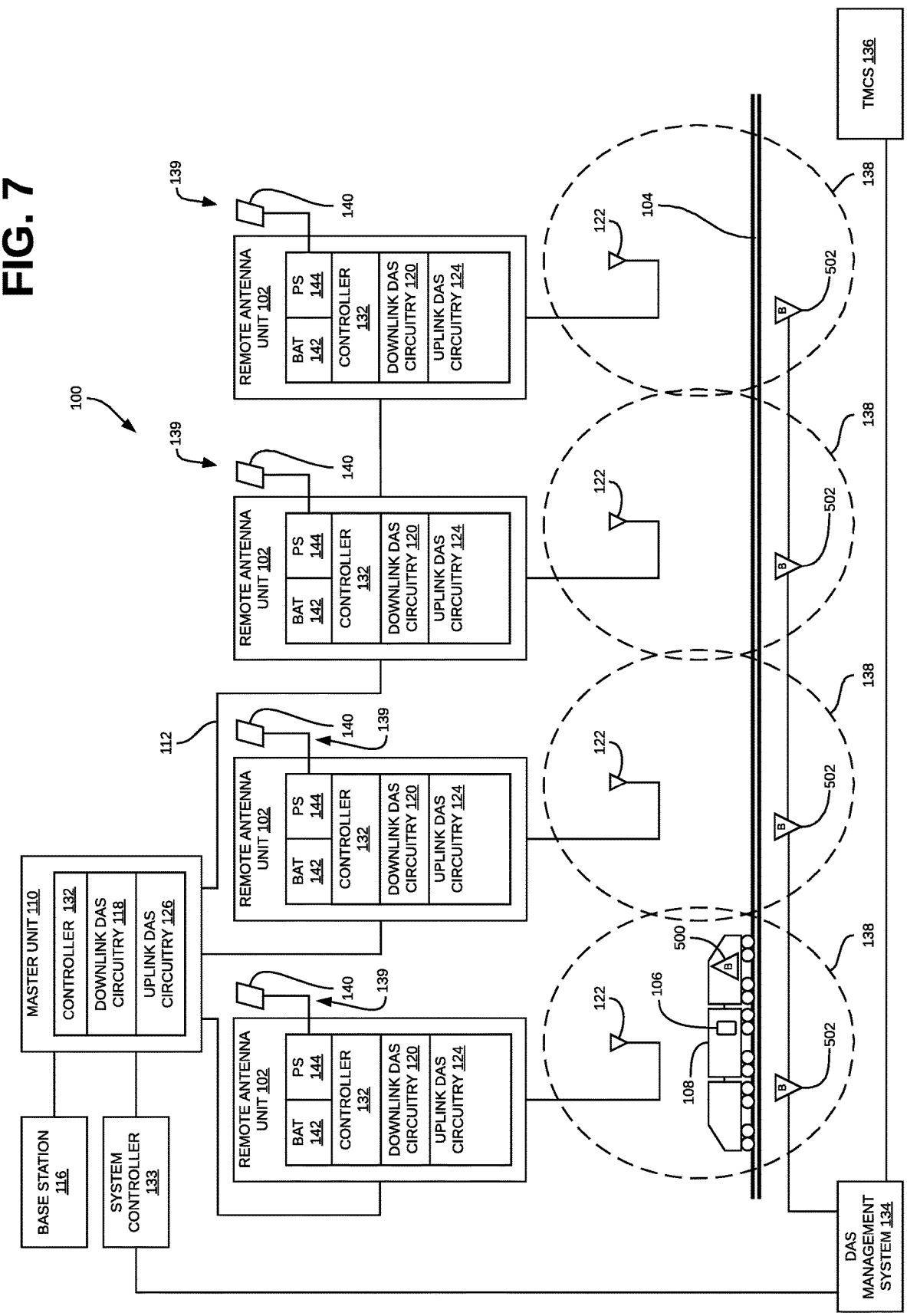
FIGS. 7 and 8 are block diagrams illustrating two other examples of how method can be implemented in the distributed antenna system of FIG. 1.
Figure 8:
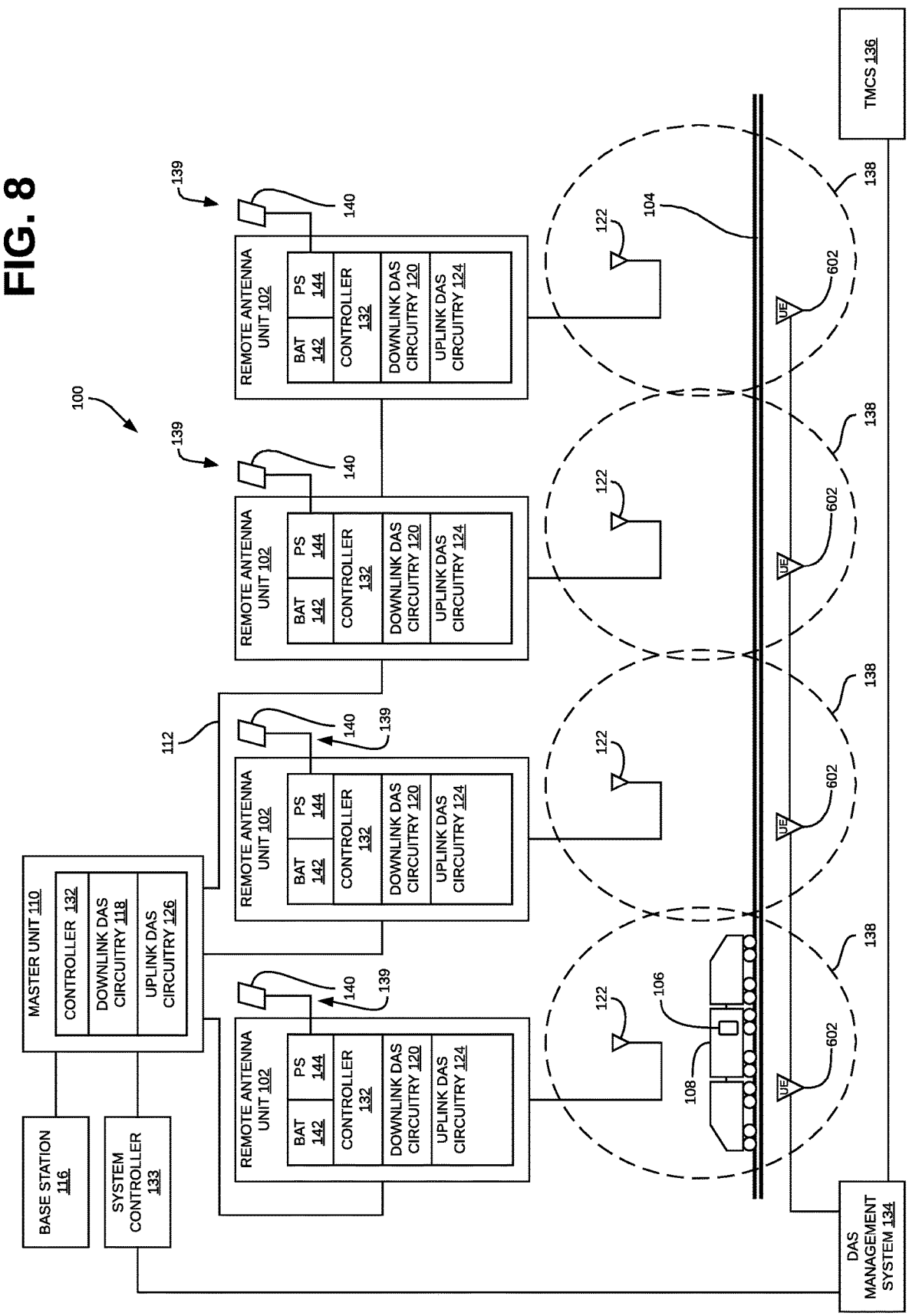

FIGS. 7 and 8 are block diagrams illustrating two other examples of how method 200 can be implemented in the distributed antenna system 100 of FIG. 1. Except as explicitly indicated below, the examples shown in FIGS. 7 and 8 are the same as the examples shown in FIGS. 5 and 6, respectively, and the corresponding portions of the description of the examples shown in FIGS. 5 and 6, respectively, set forth above apply to the examples shown in FIGS. 7 and 8, respectively, as well and are not repeated here in connection with FIGS. 7 and 8 for the sake of brevity.

In the examples shown in FIGS. 7 and 8, the DAS management system 134 directly communicates with the local controller 132 in each remote antenna unit 102 in order to cause the remote antenna unit 102 to either operate in the normal operational state or the low-power operational state. As a result, while it is operating in the low-power operational state, the remote antenna unit 102 need not provide power to any DAS beacon receiver 506 in order to detect and receive any DAS beacon transmissions.

Figure 9:
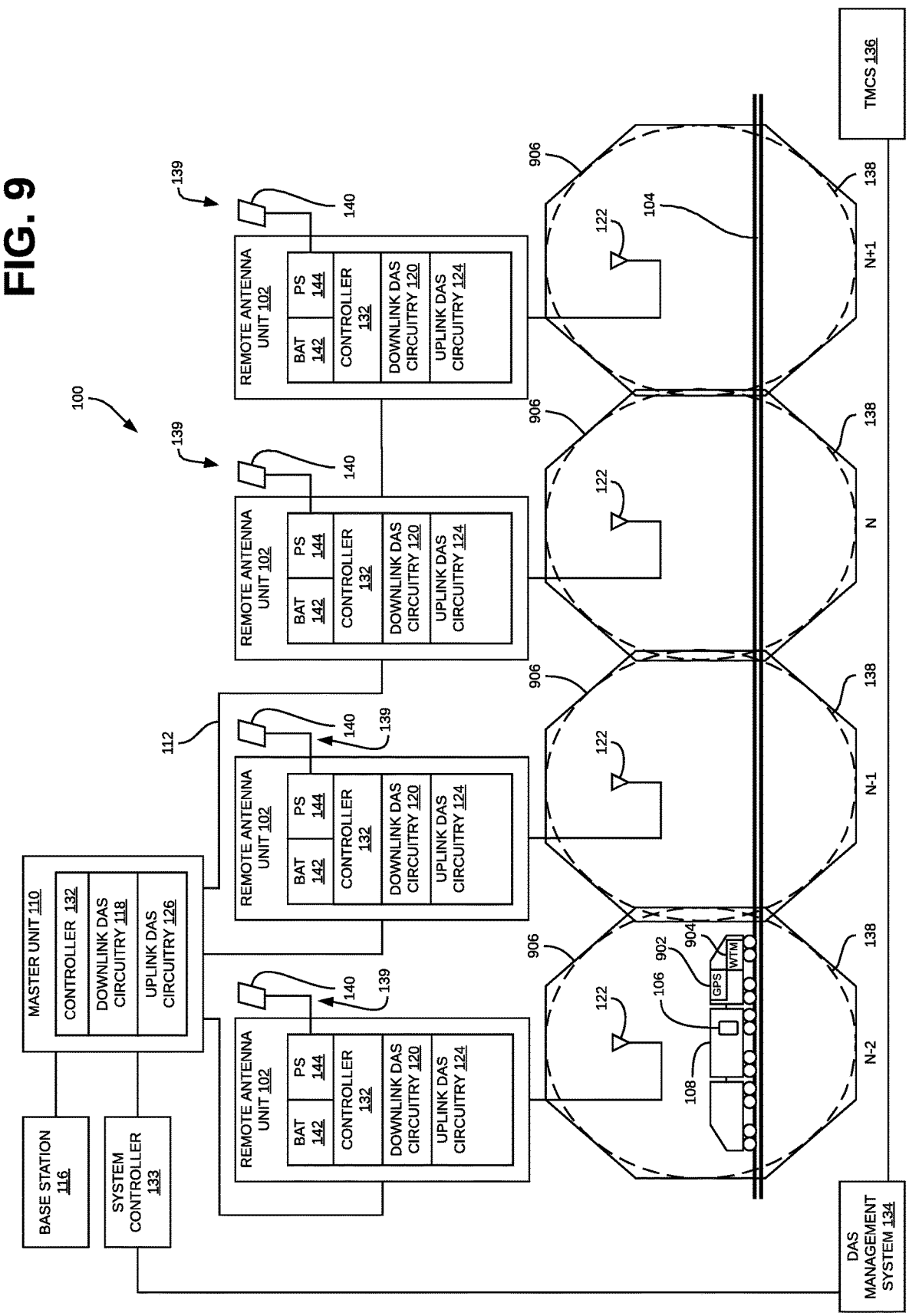

FIG. 9 is a block diagram illustrating another example of how method 200 can be implemented in the distributed antenna system 100 of FIG. 1. In the example shown in FIG. 9, each train 108 includes a position determining device 902 (such as a global positioning system (GPS) receiver) that is configured to periodically determine the current position of the train 108. Each train 108 also includes a wireless transceiver module (WTM) 904 that is configured to wirelessly communicate the current position of the train 108 to the DAS management system 134. In this example, the DAS management system 134 is configured store the geographic coordinates of a coverage polygon (CP) 906 that defines the coverage area 139 for each of the remote antenna units 102. This CP 906 can be determined using conventional coverage area mapping techniques when the remote antenna unit 102 is installed. Then, the DAS management system 134 can determine whether a train 108 is sufficiently close to the coverage area 138 to trigger a change in an operational state of the remote antenna unit 102 by checking if the current geographic position of the train 108 is sufficiently close to the coverage polygon 906 defined for that coverage area 138. Likewise, the DAS management system 134 can determine when a train 108 has exited the coverage area 138 associated with a remote antenna unit 102 by checking if the current geographic position of the train 108 is within the coverage polygon 906 defined for that coverage area 138.

In general, the DAS management system 134 can determine if the train 108 is sufficiently close to a coverage area 138 of a remote antenna unit 102 based on the time it takes a remote antenna unit 102 to transition from operating in the low-power operational state to the normal operational state. This time is also referred to here as the "transition" time.

The DAS management system 134 should cause a given remote antenna unit 102 to start transitioning from operating in the low-power operational state to the normal operational state no later than when the travel time along the track 104 from the current position of the train 108 to the closest point of the coverage area 138 is equal to the transition time. Stated another way, a train 108 is "sufficiently close" to the coverage area 138 of a remote antenna unit 102 when the travel time for the train 108 to the coverage area 138 of the remote antenna unit 102 is equal to the transition time for the remote antenna unit 102.

This travel time value can also be expressed as an offset between the current position of the train 108 and the closest point of the coverage area 138 of a given remote antenna unit 102.

Where the transition time is relatively short (for example, where the low power operational state comprises a "hot standby" state from which the remote antenna unit 102 can transition to the normal operational state relatively quickly (for example, in less than one second)), the travel time is effectively zero and a train 108 will be "sufficiently close" to the coverage area 138 of a remote antenna unit 102 when the train 108 first enters the coverage area 138 of the remote antenna unit 102.

Where the transition time is relatively long, a train 108 will be "sufficiently close" to the coverage area 138 of a remote antenna unit 102 at some point before the train 108 first enters the coverage area 138 of the remote antenna unit 102.

The travel time (or offset) can be determined in various ways.

In one example, illustrated in connection with FIG. 9, the travel time is expressed by a number of other coverage areas 138 between a train 108 and the coverage area 138 of a given remote antenna unit 102.

This approach is suitable for use in situations where the various remote access units 102 are located relatively close to each other and where there is not a large variation in the time it takes a train 108 to pass through the associated coverage areas 138 of the remote antenna units 102.

With this approach, in order to simplify the associated processing, the DAS management system 134 assumes it takes the same amount of time for a train 108 to pass through each of the coverage areas 138. The DAS management system 134 uses the longest (worst-case) time for this purpose. This worst-case time is referred to here as the "pass-through" time. Then, the travel time used by the DAS management system 134 in order to determine when a train 108 is sufficiently close to the coverage area 138 of a remote antenna unit 102 can be expressed by a number of other coverage areas 138 the train 108 must pass through before entering the coverage area 138 of that remote antenna unit 102.

The travel time (expressed in a number of coverage areas a train 108 must pass through) can be determined by dividing the transition time by the pass-through time. For example, as shown in FIG. 9, if it takes 120 seconds to transition from the low-power operating state to the normal operating state, and the worst-case pass-through time is 60 seconds, then the travel time (expressed in a number of coverage areas a train 108 must pass through) is equal to 2. Therefore, in this example, the DAS management system 134 should cause a given remote antenna unit N to start transitioning from operating in the low-power operational state to the normal operational state when the train 108 is located in the coverage area 138 of the remote antenna unit N−2 that precedes the remote antenna unit N by two coverage areas 138. Stated another way, the DAS management 134 considers a train 108 to be sufficiently close to the coverage area 138 of the remote antenna unit N when the train 108 first enters the coverage area 138 of remote antenna unit N−2.

Figure 10:
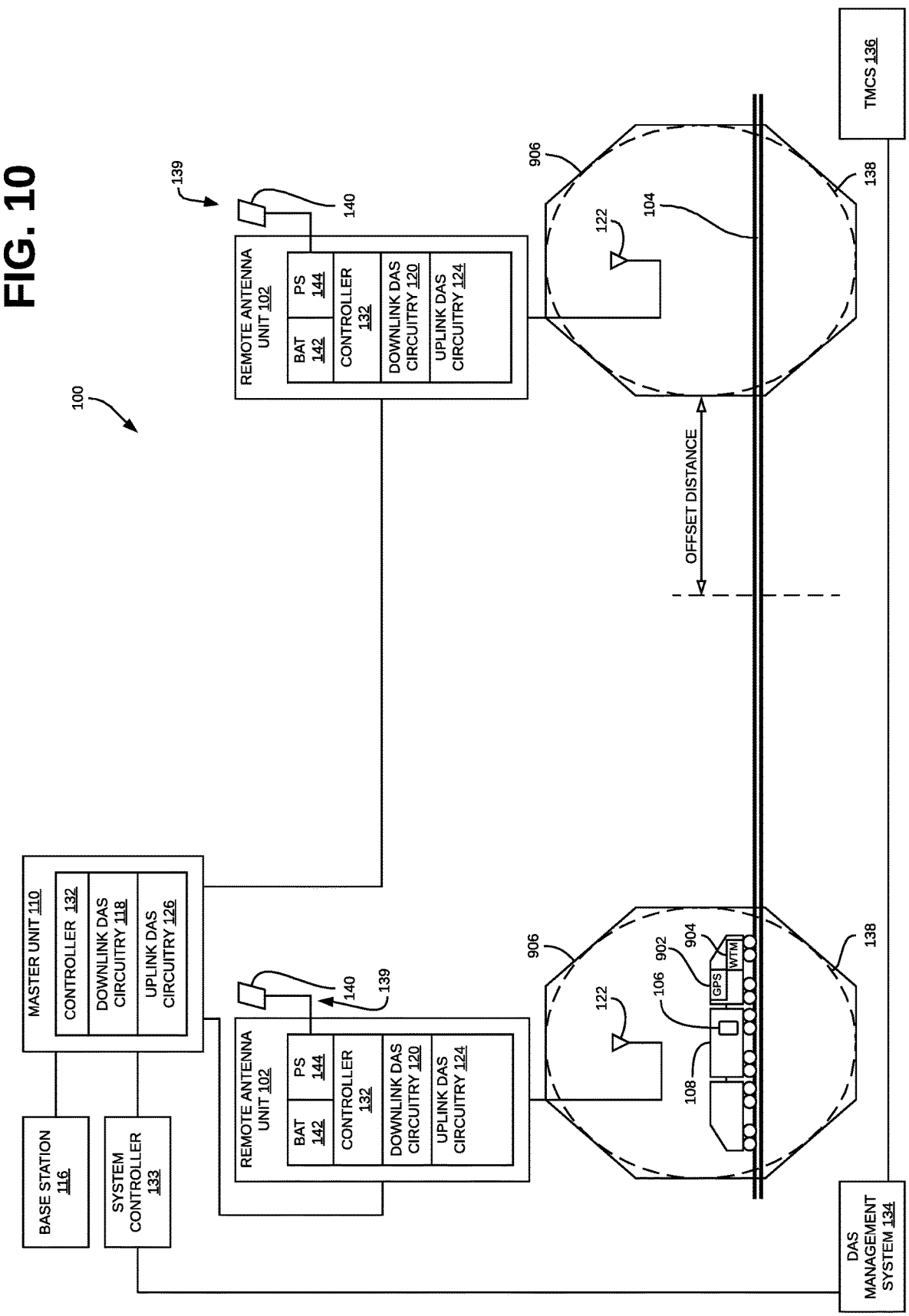
FIG. 10 illustrates how travel time can be determined using an offset that is determined dynamically based on the current speed of a train.

Another example of how the travel time can be determined is illustrated in FIG. 10. In this example, the offset is expressed as a distance along the track 104 between a train 108 and the coverage area 138 of a given remote antenna unit 102.

This approach is suitable for use in situations where the various remote access units 102 are not located relatively close to each other and/or where there is a large variation in the time it takes a train 108 to pass through the associated coverage areas 138 of the remote antenna units 102.

Figure 12:
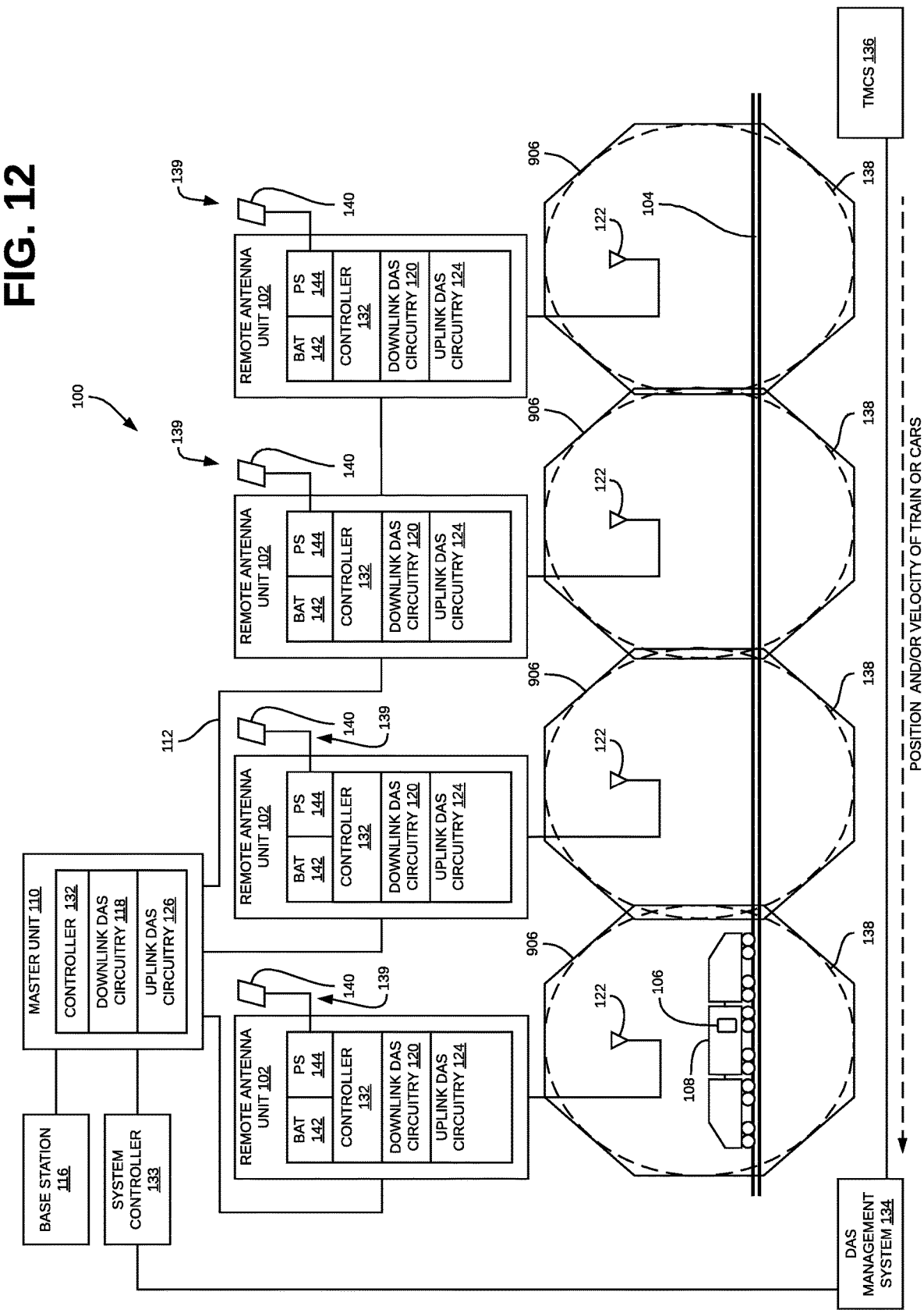
FIG. 12 illustrate an example in which a train management and control systems is configured to periodically communicate the current position and/or velocity of each train to a DAS management system.

In this example, the offset can be determined dynamically based on the current speed of the train 108. In general, the position determining device 902 (or the TMCS 136 as described below in connection with FIG. 12) will be able to determine the velocity of the train 108 and report it to the DAS management system 134. The offset can be determined as a function of the current velocity of the train 108 based on the following equation: current train velocity=offset distance/transition time.

Solving for the offset distance results in the following: offset distance=current train velocity*transition time.

Therefore, in this example, the DAS management system 134 should cause a given remote antenna unit 102 to start transitioning from operating in the low-power operational state to the normal operational state when the distance between the train 108 and the closest point of the coverage area 138 of the remote antenna unit 102 equals the calculated offset distance (where the calculated offset distance=current train velocity*transition time).

As noted above, in general, the DAS management system 134 can determine when a train 108 has exited the coverage area 138 associated with a remote antenna unit 102 by checking if the current geographic position of the train 108 is within the coverage polygon 906 defined for that coverage area 138.

In operation, while a remote antenna unit 102 is operating in the low-power operational state and there is no train sufficiently close to the coverage area 138 associated with that remote antenna unit 102 to trigger a change in an operational state of the remote antenna unit 102, the current position of the various trains 108 as determined by the respective position determining device 902 in each such train 108 will not be sufficiently close to the coverage polygon 906 defined for the coverage area 138 of that remote antenna unit 102. As a result, the DAS management system 134 will cause that remote antenna unit 102 to continue to operate in the low-power operational state.

When a train 108 moves along the tracks 104 so that it is sufficiently close to the associated coverage area 138 of that remote antenna unit 102 to trigger a change in an operational state of the remote antenna unit 102, the current position of that train 108 as determined by the position determining device 902 in that train 108 will be sufficiently close the coverage polygon defined for the coverage area 138 of that remote antenna unit 102. In response to determining this, the DAS management system 134 will cause the remote antenna unit 102 to transition to operating in the normal operational state.

When the train 108 moves out of the coverage area 138 of the remote antenna unit 102, the current position of that train 108 as determined by the position determining device 902 in that train 108 will indicate that train 108 is no longer within the coverage polygon 906 defined for the coverage area 138 of that remote antenna unit 102. Then, in response to the adjustable hysteresis period elapsing with the current position of the train 108 no longer being within the coverage polygon 906 defined for the coverage area 138 of that remote antenna unit 102, the DAS management system 134 will cause the remote antenna unit 102 to transition to operating in the low-power operational state.

Other implementations of the example shown in FIG. 10 can be implemented in other ways.

Figure 11:
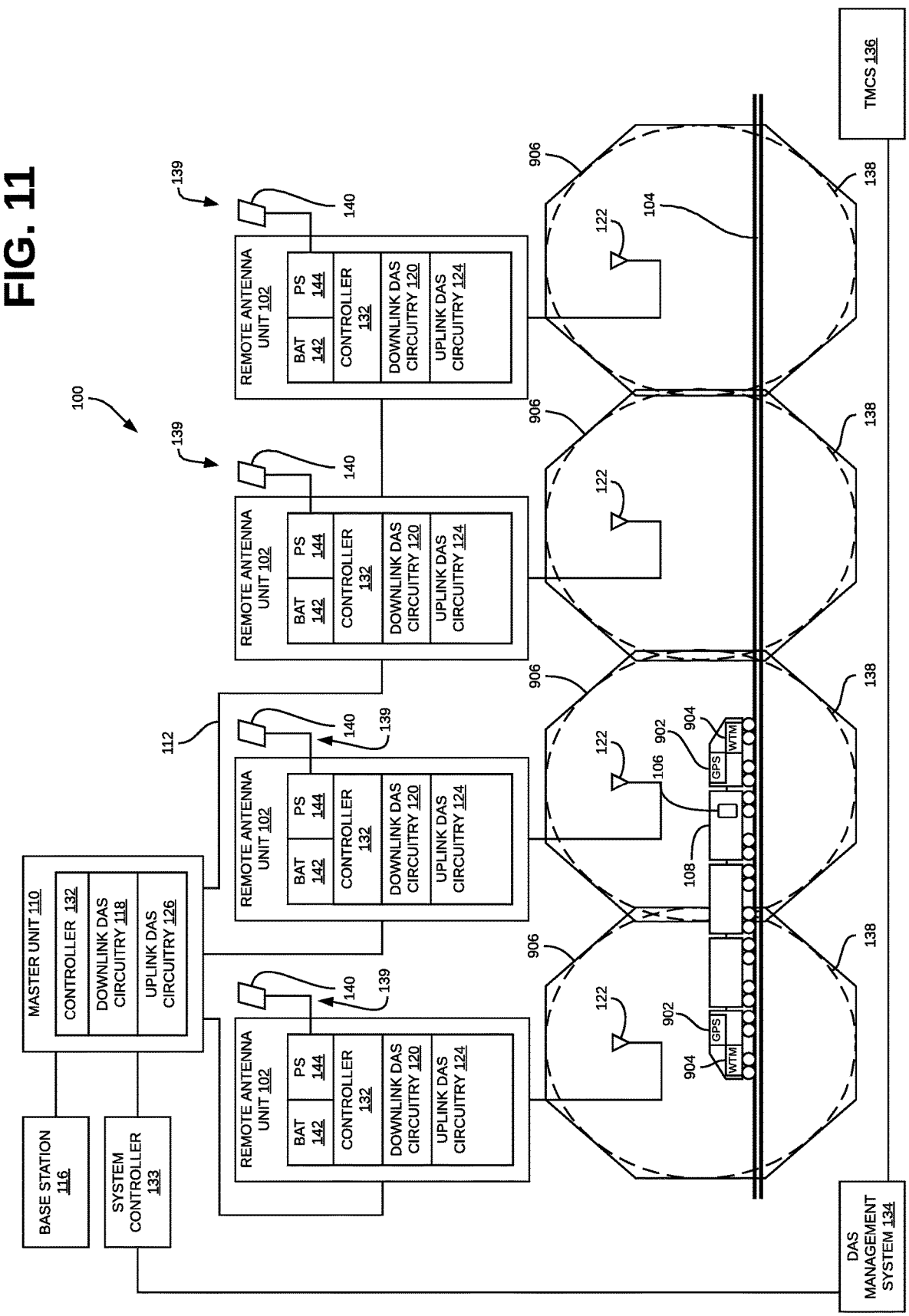
FIG. 11 illustrates how travel time can be determined by including position determination devices and wireless transceiver modules in both the first and last cars in a train.

In some other usage scenarios, it may be the case that a train 108 comprises so many cars that the first cars of the train 108 may enter the coverage area 138 of one remote antenna unit 102 while the last cars of the train 108 are still in the coverage area 138 of the previous remote antenna unit 102 (as shown in FIG. 11). In this example, the first car of the train 108 includes the position determination device 902 and wireless transceiver module 904 and will report the current position of the first car as the current position of the train 108.

One way to address this issue is to configure the DAS management system 134 so that once the train 108 reports a current position that is outside of the coverage area 138 of a remote antenna unit 102, the DAS management system 134 waits (in addition to the adjustable hysteresis period) a predetermined additional amount of time before causing the remote antenna unit 102 to operate in the low-power operational state. This predetermined additional amount of time can be configured to be sufficient for the longest possible train in railroad fleet to have entirely exited the coverage area 138 of that remote antenna unit 102 (and, possibly, including an additional safety margin).

Another way to address this issue is shown in FIG. 11. In the example shown in FIG. 11, both the first and last cars in the train 108 include respective position determination devices 902 and wireless transceiver modules 904. The current position of both the first car and the last car of the train 108 are reported to the DAS management system 134. In such an example, when the DAS management system 134 determines that the current position of the first car of a train 108 is sufficiently close to the coverage area 138 of a remote antenna unit 102, the DAS management system 134 causes the remote antenna unit 102 to operate in the normal operational state. The DAS management 134 then has the remote antenna unit 102 operate in the normal operational state until the adjustable hysteresis period has elapsed after the current position of the last car in the train 108 indicates that it has exited the coverage area 138 of that remote antenna unit 102. When this occurs, the DAS management system 134 causes the remote antenna unit 102 to operate in the low-power operational state.

In the examples shown in FIGS. 9-11, the position determination devices 902 and wireless transceiver modules 904 are deployed by the owner of the DAS 100. However, as noted above, the operator of the railroad typically uses a train management and control system (TMCS) 136 that, among other things, tracks the current location of each train 108 in the operator's fleet. In the example shown in FIG. 12, the TMCS 136 is configured to periodically communicate the current position and/or velocity of each train 108 (or the current position and/or location of the first and last cars of each train 108) to the DAS management system 134, which then uses the current position information as described above in connection with FIGS. 9-11.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a distributed antenna system (DAS) comprising: a main unit communicatively coupled to one or more base stations; and one or more remote antenna units communicatively coupled to the main unit, wherein at least one of the remote antenna units is deployed near a railroad track over which a train travels; wherein the DAS is configured to do the following for each of the at least one of the remote antenna units: cause said remote antenna unit to operate in a low-power and/or muted operational state; while said remote antenna unit is operating in the low-power and/or muted operational state, determine if the train is sufficiently close to a coverage area of said remote antenna unit to trigger a change in an operational state of said remote antenna unit; in response to determining that the train is sufficiently close to the coverage area of said remote antenna unit to trigger the change in the operational state of said remote antenna unit, cause said remote antenna unit to operate in a normal operational state; while said remote antenna unit is operating in the normal operational state, determine if the train has exited the coverage area of said remote antenna unit; and in response to determining that the train has exited the coverage area of said remote antenna unit, cause said remote antenna unit to operate in the low-power and/or muted operational state.

Example 2 includes the DAS of Example 1, wherein the DAS is configured to cause said remote antenna unit to operate in the low-power and/or muted operational state in response to an adjustable hysteresis period of time having elapsed after determining that the train has exited the coverage area of said remote antenna unit.

Example 3 includes the DAS of any of Examples 1-2, wherein the DAS is configured to determine if the train is sufficiently close to the coverage area of said remote antenna unit to trigger the change in the operational state of said remote antenna unit based on at least one of transmissions received from user equipment (UE) in the train and/or a beacon transmitter located in the train.

Example 4 includes the DAS of any of Examples 1-3, wherein the determination as to if the train is sufficiently close to the coverage area of said remote antenna unit to trigger the change in the operational state of said remote antenna unit is made by at least one of: a local controller in said remote antenna unit, a system controller for the DAS; and a DAS management application.

Example 5 includes the DAS of any of Examples 1-4, wherein the DAS is configured to cause said remote antenna unit to operate in the low-power and/or muted operational state by doing at least one of: sending a message from a DAS management system to a local controller in said remote antenna unit; and causing a DAS beacon transmitter to transmit a DAS beacon in the coverage area of said remote antenna unit for reception by a DAS beacon receiver included said remote antenna unit.

Example 6 includes the DAS of any of Examples 1-5, wherein the DAS is configured to determine if the train is sufficiently close to the coverage area of said remote antenna unit to trigger the change in the operational state of said remote antenna unit based on a current position of the train.

Example 7 includes the DAS of Example 6, wherein the current position of the train is determined using at least one of: a position determining device deployed in the train; a DAS management system; and a train management and control system used to monitor the location of the train.

Example 8 includes the DAS of any of Examples 6-7, wherein the DAS is configured to determine if the train is sufficiently close to the coverage area of said remote antenna unit to trigger the change in the operational state of said remote antenna unit based on a number of coverage areas associated with the remote antenna units between the train and the coverage area of said remote antenna unit.

Example 9 includes the DAS of any of Examples 6-8, wherein the DAS is configured to determine if the train is sufficiently close to the coverage area of said remote antenna unit to trigger the change in the operational state of said remote antenna unit based on a velocity of the train.

Example 10 includes the DAS of any of Examples 6-9, wherein the DAS is configured to determine if the train is sufficiently close to the coverage area of said remote antenna unit to trigger the change in the operational state of said remote antenna unit based on if the current position of the train is located within the coverage area of said remote antenna unit.

Example 11 includes the DAS of any of Examples 6-10, wherein the DAS is configured to determine if the train is sufficiently close to the coverage area of said remote antenna unit to trigger the change in the operational state of said remote antenna unit based on a current position of a first car in the train; and wherein the DAS is configured to determine if the train has exited the coverage area of said remote antenna unit based on a current position of a second car in the train.

Example 12 includes a method of operating a distributed antenna system (DAS), the DAS comprising a main unit communicatively coupled to one or more base stations and one or more remote antenna units communicatively coupled to the main unit, wherein at least one of the remote antenna units is deployed near a railroad track over which a train travels, the method comprising, for each of the at least one remote antenna units: causing said remote antenna unit to operate in a low-power and/or muted operational state; while said remote antenna unit is operating in the low-power and/or muted operational state, determining if the train is sufficiently close to a coverage area of said remote antenna unit to trigger a change in an operational state of said remote antenna unit; in response to determining that the train is sufficiently close to the coverage area of said remote antenna unit to trigger the change in the operational state of said remote antenna unit, causing said remote antenna unit to operate in a normal operational state; while said remote antenna unit is operating in the normal operational state, determining if the train has exited the coverage area of said remote antenna unit; and in response to determining that the train has exited the coverage area of said remote antenna unit, causing said remote antenna unit to operate in the low-power and/or muted operational state.

Example 13 includes the method of claim 12, wherein, in response to determining that the train has exited the coverage area of said remote antenna unit, causing said remote antenna unit to operate in the low-power and/or muted operational state comprises: causing said remote antenna unit to operate in the low-power and/or muted operational state in response to an adjustable hysteresis period of time having elapsed after determining that the train has exited the coverage area of said remote antenna unit.

Example 14 includes the method of any of Examples 12-13, wherein determining if the train is sufficiently close to the coverage area of said remote antenna unit to trigger the change in the operational state of said remote antenna unit comprises: determining if the train is sufficiently close to the coverage area of said remote antenna unit to trigger the change in the operational state of said remote antenna unit based on at least one of: transmissions received from user equipment (UE) in the train and/or a beacon transmitter located in the train.

Example 15 includes the method of any of Examples 12-14, wherein the determination as to if the train is sufficiently close to the coverage area of said remote antenna unit to trigger the change in the operational state of said remote antenna unit is made by at least one of: a local controller in said remote antenna unit, a system controller for the DAS; and a DAS management application.

Example 16 includes the method of any of Examples 12-15, wherein causing said remote antenna unit to operate in the low-power and/or muted operational state comprises: sending a message from a DAS management system to a local controller in said remote antenna unit; and causing a DAS beacon transmitter to transmit a DAS beacon in the coverage area of said remote antenna unit for reception by a DAS beacon receiver included said remote antenna unit.

Example 17 includes the method of any of Examples 12-16, wherein determining if the train is sufficiently close to the coverage area of said remote antenna unit to trigger the change in the operational state of said remote antenna unit comprises determining if the train is sufficiently close to the coverage area of said remote antenna unit to trigger the change in the operational state of said remote antenna unit based on a current position of the train.

Example 18 includes the method of Example 17, wherein the current position of the train is determined using at least one of: a position determining device deployed in the train; a DAS management system; and a train management and control system used to monitor the location of the train.

Example 19 includes the method of any of Examples 17-18, wherein determining if the train is sufficiently close to the coverage area of said remote antenna unit to trigger the change in the operational state of said remote antenna unit comprises: determining if the train is sufficiently close to the coverage area of said remote antenna unit to trigger the change in the operational state of said remote antenna unit based on a number of coverage areas associated with the remote antenna units between the train and the coverage area of said remote antenna unit.

Example 20 includes the method of any of Examples 17-19, wherein determining if the train is sufficiently close to the coverage area of said remote antenna unit to trigger the change in the operational state of said remote antenna unit comprises: determining if the train is sufficiently close to the coverage area of said remote antenna unit to trigger the change in the operational state of said remote antenna unit based on a velocity of the train.

Example 21 includes the method of any of Examples 17-20, wherein determining if the train is sufficiently close to the coverage area of said remote antenna unit to trigger the change in the operational state of said remote antenna unit comprises: determining if the train is sufficiently close to the coverage area of said remote antenna unit to trigger the change in the operational state of said remote antenna unit based on if the current position of the train is located within the coverage area of said remote antenna unit.

Example 22 includes the method of any of Examples 17-21, wherein determining if the train is sufficiently close to the coverage area of said remote antenna unit to trigger the change in the operational state of said remote antenna unit comprises: determining if the train is sufficiently close to the coverage area of said remote antenna unit to trigger the change in the operational state of said remote antenna unit based on a current position of a first car in the train; and wherein determining if the train has exited the coverage area of said remote antenna unit comprises: determining if the train has exited the coverage area of said remote antenna unit based on a current position of a second car in the train.

What is claimed is:

1. A distributed antenna system (DAS) comprising:
    a main unit communicatively coupled to one or more base stations; and
    one or more remote antenna units communicatively coupled to the main unit, wherein at least one of the remote antenna units is deployed near a railroad track over which a train travels;
    wherein the DAS is configured to do the following for each of the at least one of the remote antenna units:
        cause said remote antenna unit to operate in a low-power and/or muted operational state;
        while said remote antenna unit is operating in the low-power and/or muted operational state, determine if the train is sufficiently close to a coverage area of said remote antenna unit to trigger a change in an operational state of said remote antenna unit;
        in response to determining that the train is sufficiently close to the coverage area of said remote antenna unit to trigger the change in the operational state of said remote antenna unit, cause said remote antenna unit to operate in a normal operational state;
        while said remote antenna unit is operating in the normal operational state, determine if the train has exited the coverage area of said remote antenna unit; and
        in response to determining that the train has exited the coverage area of said remote antenna unit, cause said remote antenna unit to operate in the low-power and/or muted operational state.

2. The DAS of claim 1, wherein the DAS is configured to cause said remote antenna unit to operate in the low-power and/or muted operational state in response to an adjustable hysteresis period of time having elapsed after determining that the train has exited the coverage area of said remote antenna unit.

3. The DAS of claim 1, wherein the DAS is configured to determine if the train is sufficiently close to the coverage area of said remote antenna unit to trigger the change in the operational state of said remote antenna unit based on at least one of transmissions received from user equipment (UE) in the train and/or a beacon transmitter located in the train.

4. The DAS of claim 1, wherein the determination as to if the train is sufficiently close to the coverage area of said remote antenna unit to trigger the change in the operational state of said remote antenna unit is made by at least one of: a local controller in said remote antenna unit, a system controller for the DAS; and a DAS management application.

5. The DAS of claim 1, wherein the DAS is configured to cause said remote antenna unit to operate in the low-power and/or muted operational state by doing at least one of:
    sending a message from a DAS management system to a local controller in said remote antenna unit; and
    causing a DAS beacon transmitter to transmit a DAS beacon in the coverage area of said remote antenna unit for reception by a DAS beacon receiver included said remote antenna unit.

6. The DAS of claim 1, wherein the DAS is configured to determine if the train is sufficiently close to the coverage area of said remote antenna unit to trigger the change in the operational state of said remote antenna unit based on a current position of the train.

7. The DAS of claim 6, wherein the current position of the train is determined using at least one of:
   a position determining device deployed in the train;
   a DAS management system; and
   a train management and control system used to monitor the location of the train.

8. The DAS of claim 6, wherein the DAS is configured to determine if the train is sufficiently close to the coverage area of said remote antenna unit to trigger the change in the operational state of said remote antenna unit based on a number of coverage areas associated with the remote antenna units between the train and the coverage area of said remote antenna unit.

9. The DAS of claim 6, wherein the DAS is configured to determine if the train is sufficiently close to the coverage area of said remote antenna unit to trigger the change in the operational state of said remote antenna unit based on a velocity of the train.

10. The DAS of claim 6, wherein the DAS is configured to determine if the train is sufficiently close to the coverage area of said remote antenna unit to trigger the change in the operational state of said remote antenna unit based on if the current position of the train is located within the coverage area of said remote antenna unit.

11. The DAS of claim 6, wherein the DAS is configured to determine if the train is sufficiently close to the coverage area of said remote antenna unit to trigger the change in the operational state of said remote antenna unit based on a current position of a first car in the train; and
   wherein the DAS is configured to determine if the train has exited the coverage area of said remote antenna unit based on a current position of a second car in the train.

12. A method of operating a distributed antenna system (DAS), the DAS comprising a main unit communicatively coupled to one or more base stations and one or more remote antenna units communicatively coupled to the main unit, wherein at least one of the remote antenna units is deployed near a railroad track over which a train travels, the method comprising, for each of the at least one remote antenna units:
   causing said remote antenna unit to operate in a low-power and/or muted operational state;
   while said remote antenna unit is operating in the low-power and/or muted operational state, determining if the train is sufficiently close to a coverage area of said remote antenna unit to trigger a change in an operational state of said remote antenna unit;
   in response to determining that the train is sufficiently close to the coverage area of said remote antenna unit to trigger the change in the operational state of said remote antenna unit, causing said remote antenna unit to operate in a normal operational state;
   while said remote antenna unit is operating in the normal operational state, determining if the train has exited the coverage area of said remote antenna unit; and
   in response to determining that the train has exited the coverage area of said remote antenna unit, causing said remote antenna unit to operate in the low-power and/or muted operational state.

13. The method of claim 12, wherein, in response to determining that the train has exited the coverage area of said remote antenna unit, causing said remote antenna unit to operate in the low-power and/or muted operational state comprises:
   causing said remote antenna unit to operate in the low-power and/or muted operational state in response to an adjustable hysteresis period of time having elapsed after determining that the train has exited the coverage area of said remote antenna unit.

14. The method of claim 12, wherein determining if the train is sufficiently close to the coverage area of said remote antenna unit to trigger the change in the operational state of said remote antenna unit comprises:
   determining if the train is sufficiently close to the coverage area of said remote antenna unit to trigger the change in the operational state of said remote antenna unit based on at least one of transmissions received from user equipment (UE) in the train and/or a beacon transmitter located in the train.

15. The method of claim 12, wherein the determination as to if the train is sufficiently close to the coverage area of said remote antenna unit to trigger the change in the operational state of said remote antenna unit is made by at least one of: a local controller in said remote antenna unit, a system controller for the DAS; and a DAS management application.

16. The method of claim 12, wherein causing said remote antenna unit to operate in the low-power and/or muted operational state comprises:
   sending a message from a DAS management system to a local controller in said remote antenna unit; and
   causing a DAS beacon transmitter to transmit a DAS beacon in the coverage area of said remote antenna unit for reception by a DAS beacon receiver included said remote antenna unit.

17. The method of claim 12, wherein determining if the train is sufficiently close to the coverage area of said remote antenna unit to trigger the change in the operational state of said remote antenna unit comprises determining if the train is sufficiently close to the coverage area of said remote antenna unit to trigger the change in the operational state of said remote antenna unit based on a current position of the train.

18. The method of claim 17, wherein the current position of the train is determined using at least one of:
   a position determining device deployed in the train;
   a DAS management system; and
   a train management and control system used to monitor the location of the train.

19. The method of claim 17, wherein determining if the train is sufficiently close to the coverage area of said remote antenna unit to trigger the change in the operational state of said remote antenna unit comprises:
   determining if the train is sufficiently close to the coverage area of said remote antenna unit to trigger the change in the operational state of said remote antenna unit based on a number of coverage areas associated with the remote antenna units between the train and the coverage area of said remote antenna unit.

20. The method of claim 17, wherein determining if the train is sufficiently close to the coverage area of said remote antenna unit to trigger the change in the operational state of said remote antenna unit comprises:
   determining if the train is sufficiently close to the coverage area of said remote antenna unit to trigger the change in the operational state of said remote antenna unit based on a velocity of the train.

21. The method of claim 17, wherein determining if the train is sufficiently close to the coverage area of said remote antenna unit to trigger the change in the operational state of said remote antenna unit comprises:

determining if the train is sufficiently close to the coverage area of said remote antenna unit to trigger the change in the operational state of said remote antenna unit based on if the current position of the train is located within the coverage area of said remote antenna unit.

22. The method of claim 17, wherein determining if the train is sufficiently close to the coverage area of said remote antenna unit to trigger the change in the operational state of said remote antenna unit comprises:
   determining if the train is sufficiently close to the coverage area of said remote antenna unit to trigger the change in the operational state of said remote antenna unit based on a current position of a first car in the train; and
   wherein determining if the train has exited the coverage area of said remote antenna unit comprises:
   determining if the train has exited the coverage area of said remote antenna unit based on a current position of a second car in the train.

* * * * *